United States Patent [19]

Ohta et al.

[11] 4,279,981
[45] Jul. 21, 1981

[54] ELECTROPHOTOGRAPHIC ELEMENTS CONTAINING TRISAZO COMPOUNDS

[75] Inventors: Masafumi Ohta, Yokohama; Kiyoshi Sakai, Tokyo; Mitsuru Hashimoto, Hino; Akio Kozima, Yokohama; Masaomi Sasaki, Kawasaki, all of Japan

[73] Assignee: Ricoh Company, Ltd., Tokyo, Japan

[21] Appl. No.: 897,508

[22] Filed: Apr. 18, 1978

[30] Foreign Application Priority Data

Apr. 22, 1977 [JP] Japan .................................. 52/45812
Apr. 25, 1977 [JP] Japan .................................. 52/46859

[51] Int. Cl.³ .............................................. G03G 5/06
[52] U.S. Cl. ......................................... 430/73; 430/58; 430/75; 430/76; 260/169
[58] Field of Search ..................... 430/58, 72, 73, 75, 430/78, 76; 260/169

[56] References Cited

U.S. PATENT DOCUMENTS

| | | | |
|---|---|---|---|
| 3,775,105 | 11/1973 | Kukla | 96/1.6 |
| 3,837,851 | 9/1974 | Shattuck et al. | 96/1.5 |
| 3,871,882 | 3/1975 | Wiedemann | 96/1.5 |
| 3,977,870 | 8/1976 | Rochlitz | 96/1.5 |
| 4,018,607 | 4/1977 | Gontois | 96/1.5 |
| 4,026,704 | 5/1977 | Rochlitz et al. | 96/1.5 |
| 4,051,123 | 9/1977 | Piller et al. | 96/1.6 |
| 4,052,210 | 10/1977 | Hectors | 96/1.5 |

OTHER PUBLICATIONS

Schlosser, A New Organic Double-Layer System and Its Photoconductive Mechanism, JAPE, vol. 4, #3, pp. 118–122.

*Primary Examiner*—Dennis E. Talbert, Jr.
*Assistant Examiner*—John L. Goodrow
*Attorney, Agent, or Firm*—Blanchard, Flynn, Thiel, Boutell & Tanis

[57] ABSTRACT

The present invention provides trisazo compounds expressed by the general formula I

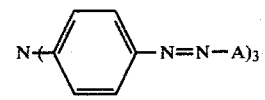

[wherein A represents or

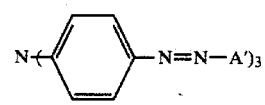

[wherein A' represents

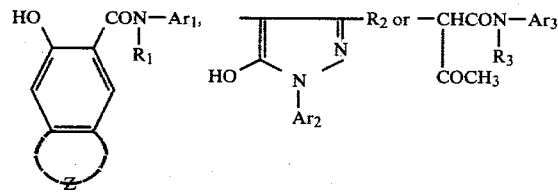

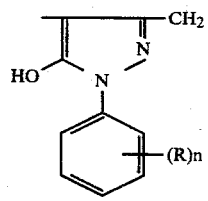

-continued (wherein R represents hydrogen, alkyl radical, alkoxy radical, nitro radical, dialkylamino radical or halogen, and n is an integer of 1, 2 or 3, R may be either identical or different when n is an integer of 2 or 3)]; a process for the preparation of said trisazo compounds; and electrophotographic sensitive materials having a high sensitivity as well as a high flexibility which comprise a conductive support and a photosensitive layer containing a trisazo compound, as an effective ingredient thereof, which is expressed by the general formula II (wherein Z represents aromatic rings such as benzene ring, naphthalene ring, etc., hetero rings such as indole ring, carbazole ring, benzofuran ring, etc. or their substituents, $Ar_1$ represents aromatic rings such as benzene ring, naphthalene ring, etc., hetero rings such as dibenzofuran ring, etc. or their substituents, $Ar_2$ and $Ar_3$ represent aromatic rings such as benzene ring, naphthalene ring, etc. or their substituents, $R_1$ and $R_3$ represent hydrogen, lower alkyl radical, phenyl radical or their substituents, and $R_2$ represents lower alkyl radical, carboxyl radical or their esters)].

66 Claims, 10 Drawing Figures

ELECTROPHOTOGRAPHIC ELEMENTS CONTAINING TRISAZO COMPOUNDS

BACKGROUND OF THE INVENTION (a) Field of the Invention

The present invention relates to novel trisazo compounds, a process for the preparation of said trisazo compounds, and electrophotographic sensitive materials comprising said compounds or analogues thereof as effective ingredient.

(b) Description of the Prior Art

It is known that some organic compounds, e.g., indigotype compounds, phthalocyanine compounds, etc., are useful as a photoconductive material to be employed for the electrophotographic process. The "electrophotographic process" herein is one of the image-forming processes which generally comprises first charging a photoconductive sensitive material with electricity by corona discharge or the like in the dark, subsequently subjecting it to image-wise exposure so as to discharge the electric charge of the exposed area selectively, thereby obtaining an electrostatic latent image, and then rendering visible this latent image by a developing means employing a toner or the like, thereby forming an intended image. As the fundamental characteristics required for the photosensitive materials for use in the electrophotographic process, there are enumerated (1) chargeability in the dark to attain an appropriate potential, (2) low dischargeability in the dark, and (3) rapid dischargeability upon exposure to light. As a matter of fact, however, the hitherto known organic photoconductive compounds have not always sufficiently satisfied these requirements.

Some inorganic simple substances or inorganic compounds such as selenium, zinc oxide, etc. are also known as useful photoconductive materials, of which selenium has admittedly been widely put to practical use. However, with the adoption of various processes in the latest electrophotographic process art, there is an increasing demand for a photosensitive material suitable for any of these processes, that is, a demand for, for instance, a belt-shaped photosensitive material having flexibility with respect to its shape in addition to the aforementioned fundamental characteristics. In this regard, selenium is generally difficult to form into a photosensitive material having such a shape as discussed above.

Meanwhile, there are known electrophotographic sensitive materials prepared by forming a photosensitive layer containing some azo compound, as an effective ingredient, on a conductive support such as, for instance, one prepared by employing monoazo compound as disclosed in Japanese Patent Publication No. 16474/1969 and one prepared by employing disazo compound as disclosed in U.S. Pat. Nos. 3,898,048 and 4,052,210. These azo compounds are admittedly useful materials as an effective ingredient of photosensitive materials, but when various requirements for photosensitive materials are taken into account from the viewpoint of the electrophotographic process, there has in fact not yet been obtained such a material as will sufficiently meet these requirements. Therefore, it is a matter of more importance to provide a wide variety of compounds, not limiting to azo compounds, so as to afford a wide range of selection of compounds acting as an effective ingredient according to various electrophotographic processes, thereby rendering it possible to provide a photosensitive material apposite to any specific process. In other words, it is desirable for the electrophotographic process that the variety of compounds workable as an effective ingredient of photosensitive materials is as wide as possible.

BRIEF DESCRIPTION OF THE DRAWINGS

In FIGS. 8 through 10 of the drawings, 1 denotes a conductive support. 2.2',2" denote photosensitive layers, respectively, 3 denotes a binder, 4 denotes particles of a trisazo compound, 5 denotes a charge-transfer medium, 6 denotes a charge-carrier generating layer, and 7 denotes a charge-transfer medium layer.

SUMMARY OF THE INVENTION

Figure 1:
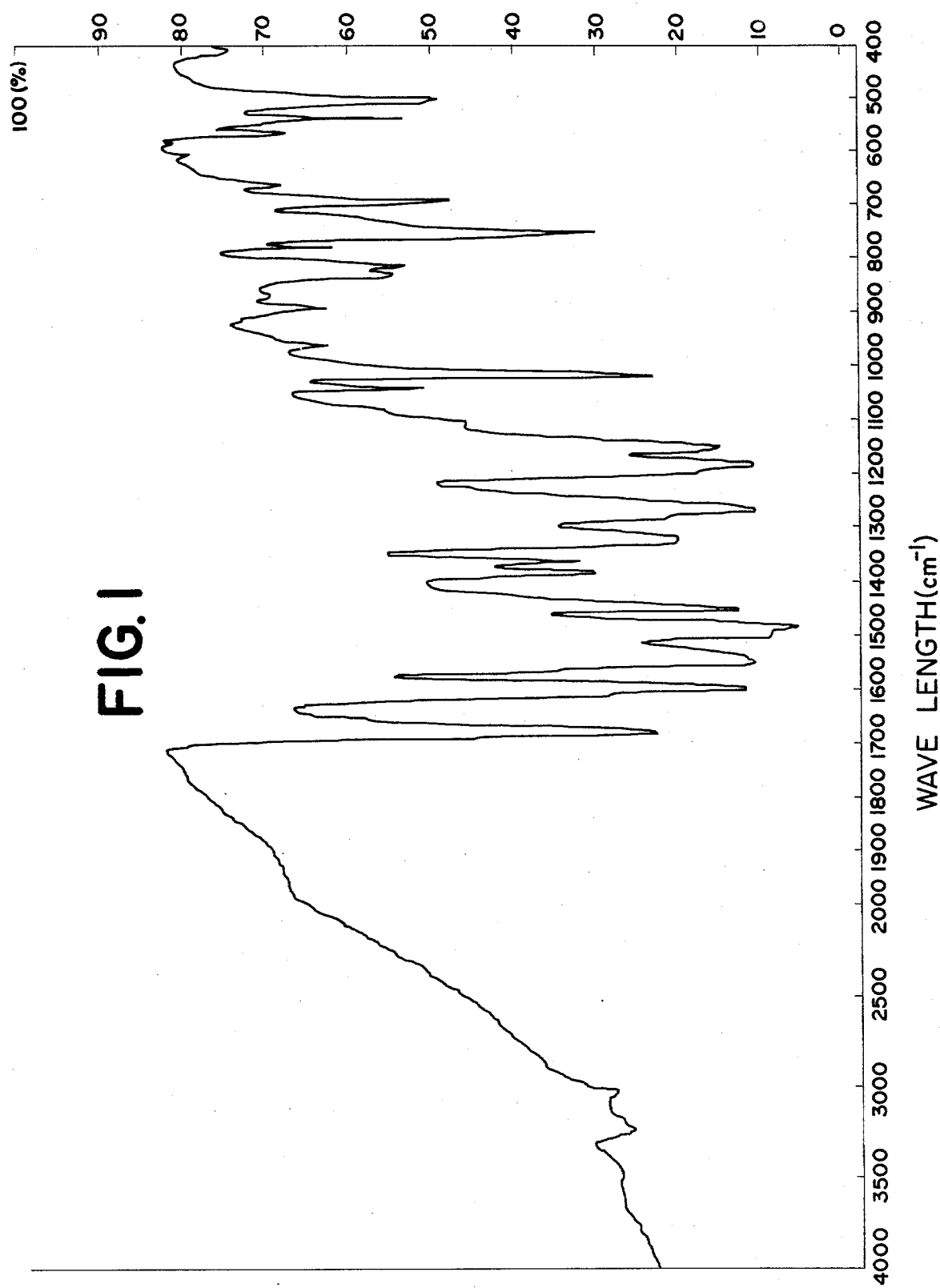
FIGS. 1 through 7 are respectively diagrammatic representations of the infrared spectra of various trisazo compounds according to the present invention.
Figure 2:
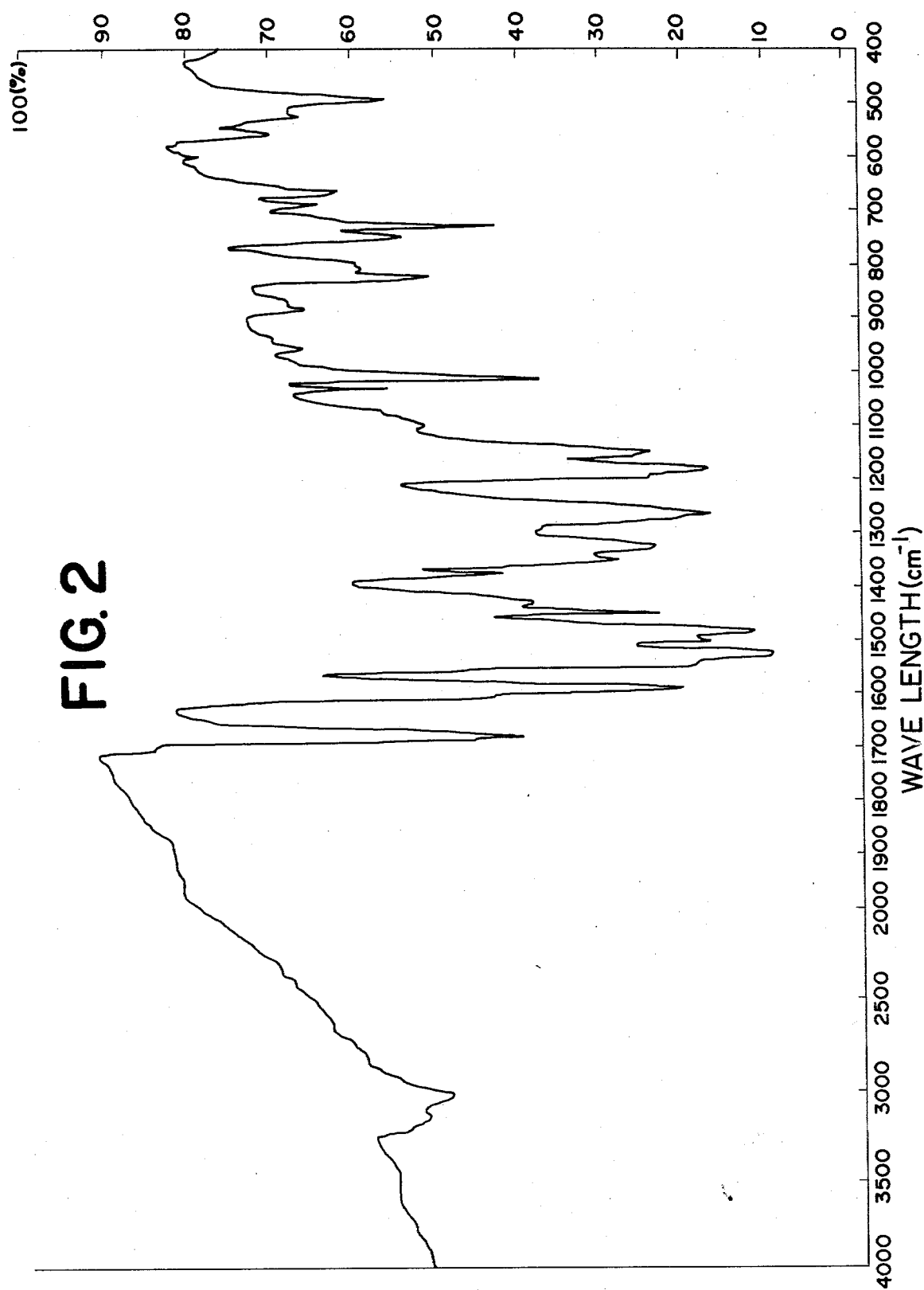
Figure 3:
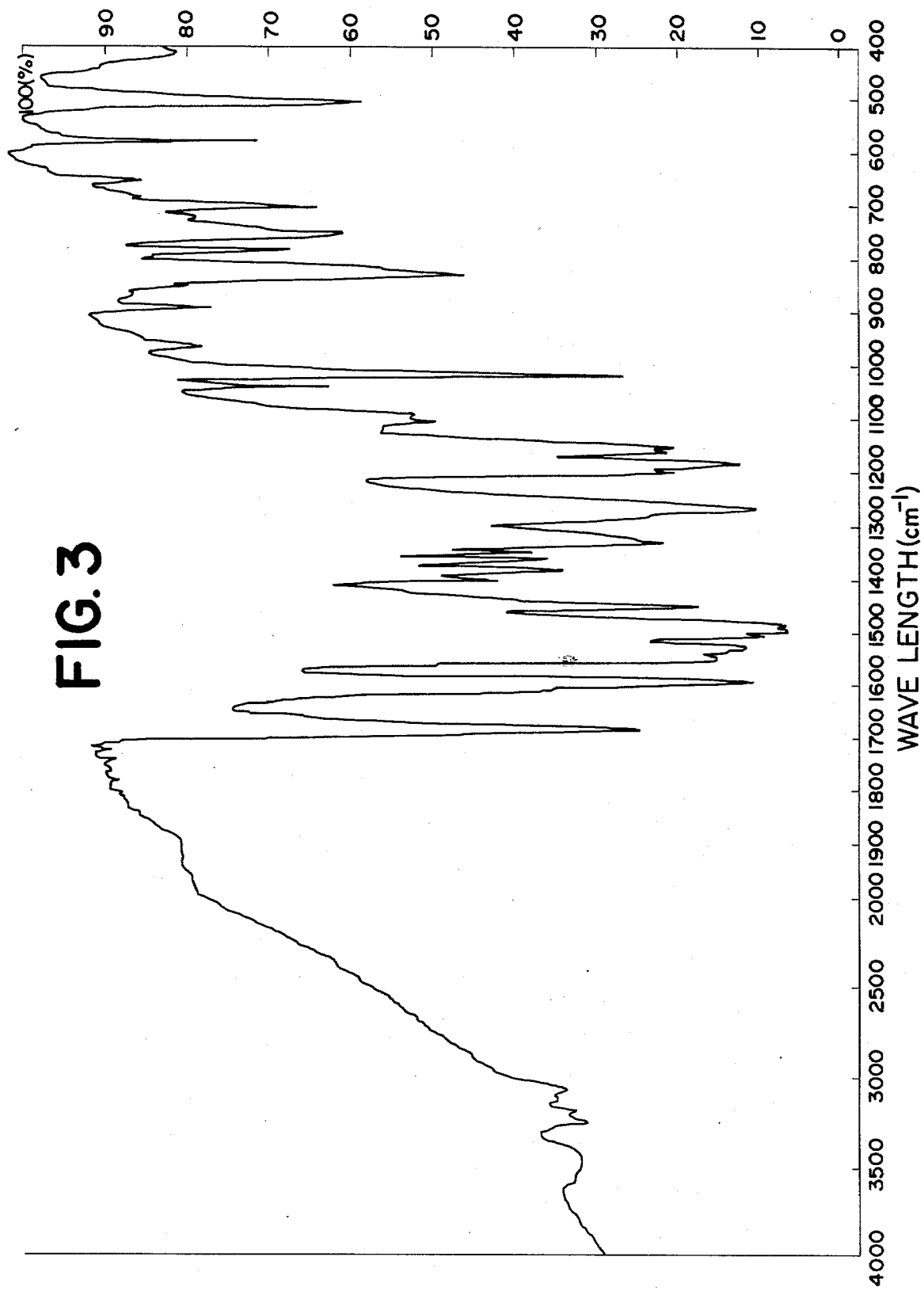
Figure 4:
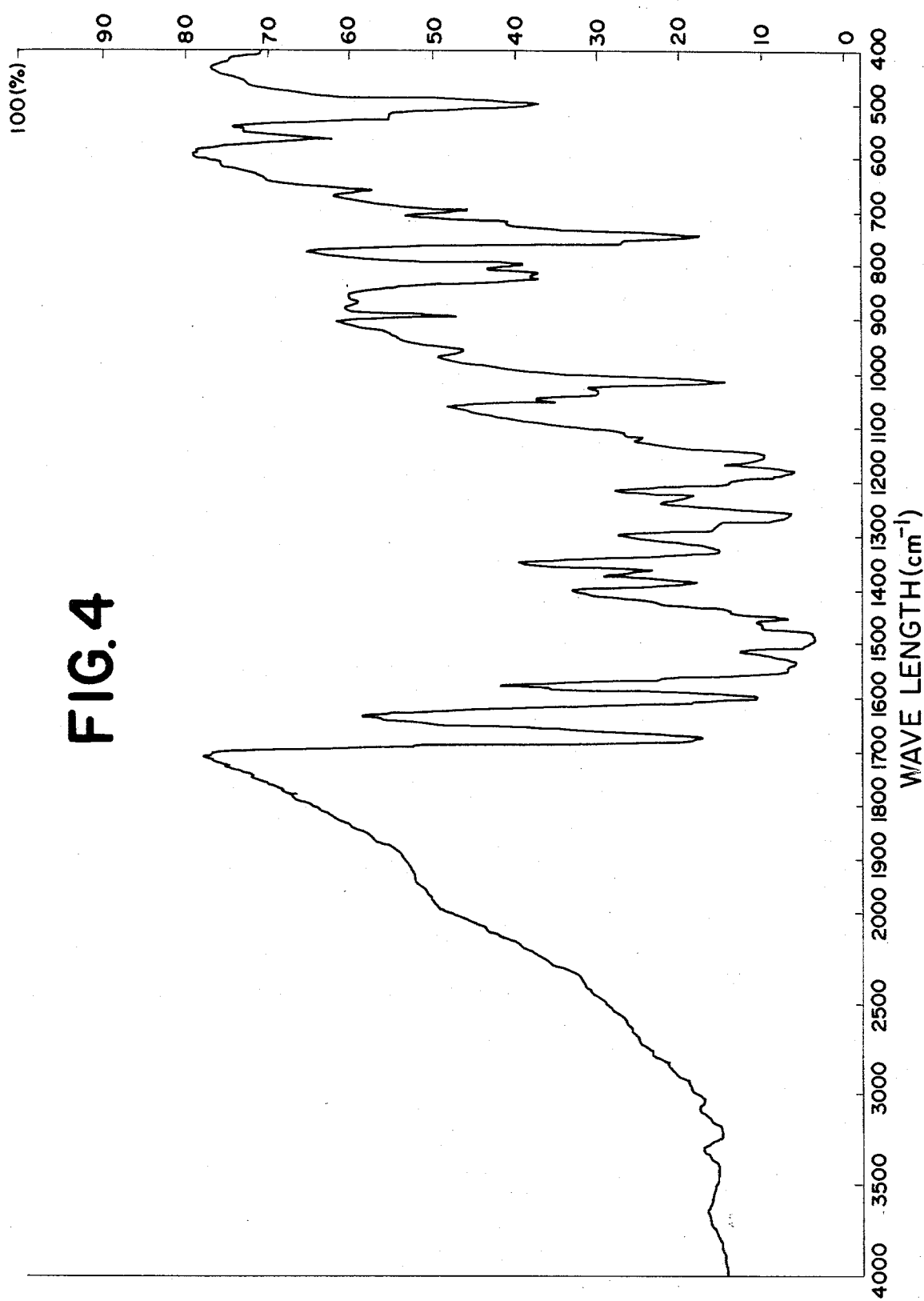
Figure 5:
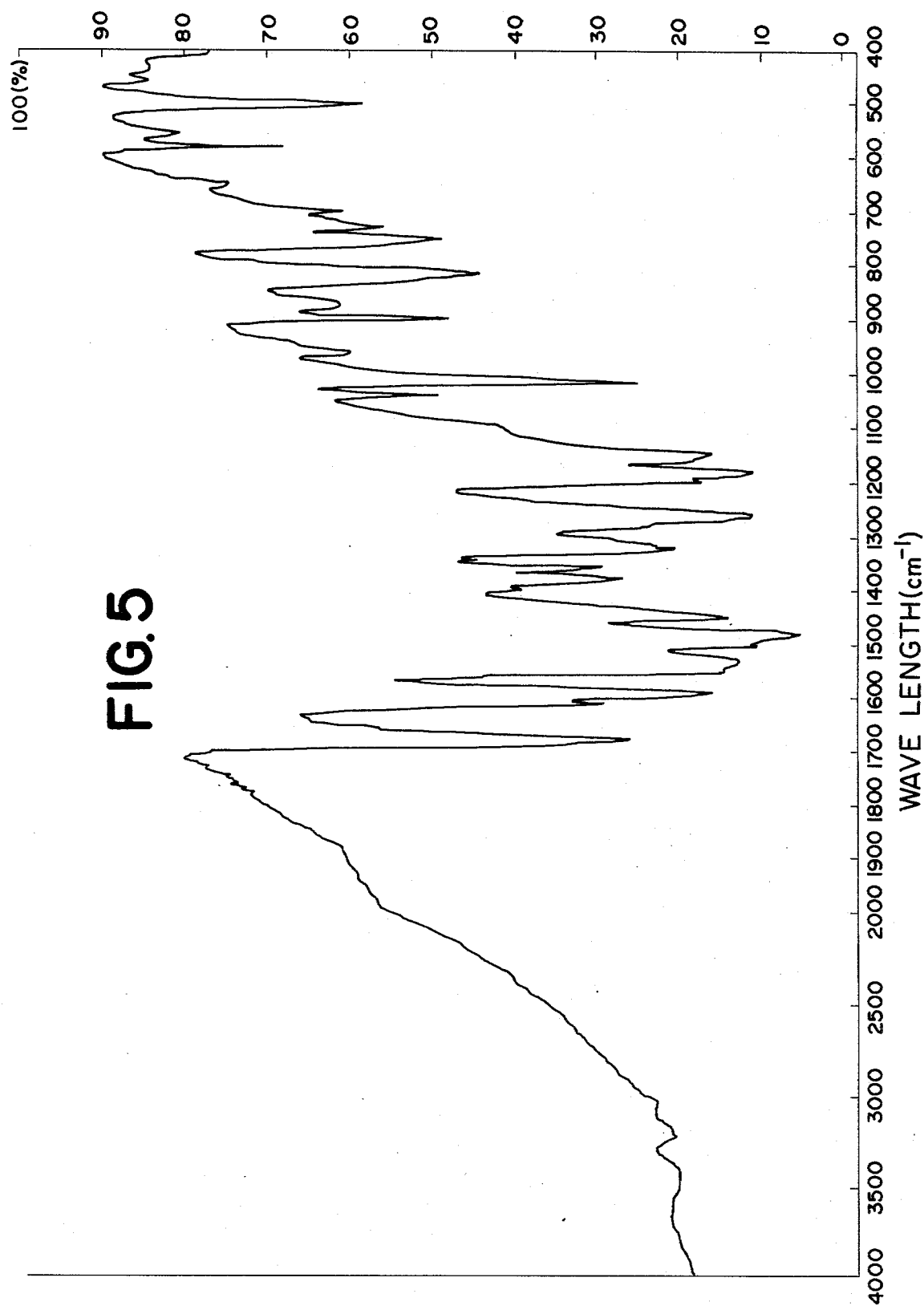
Figure 6:
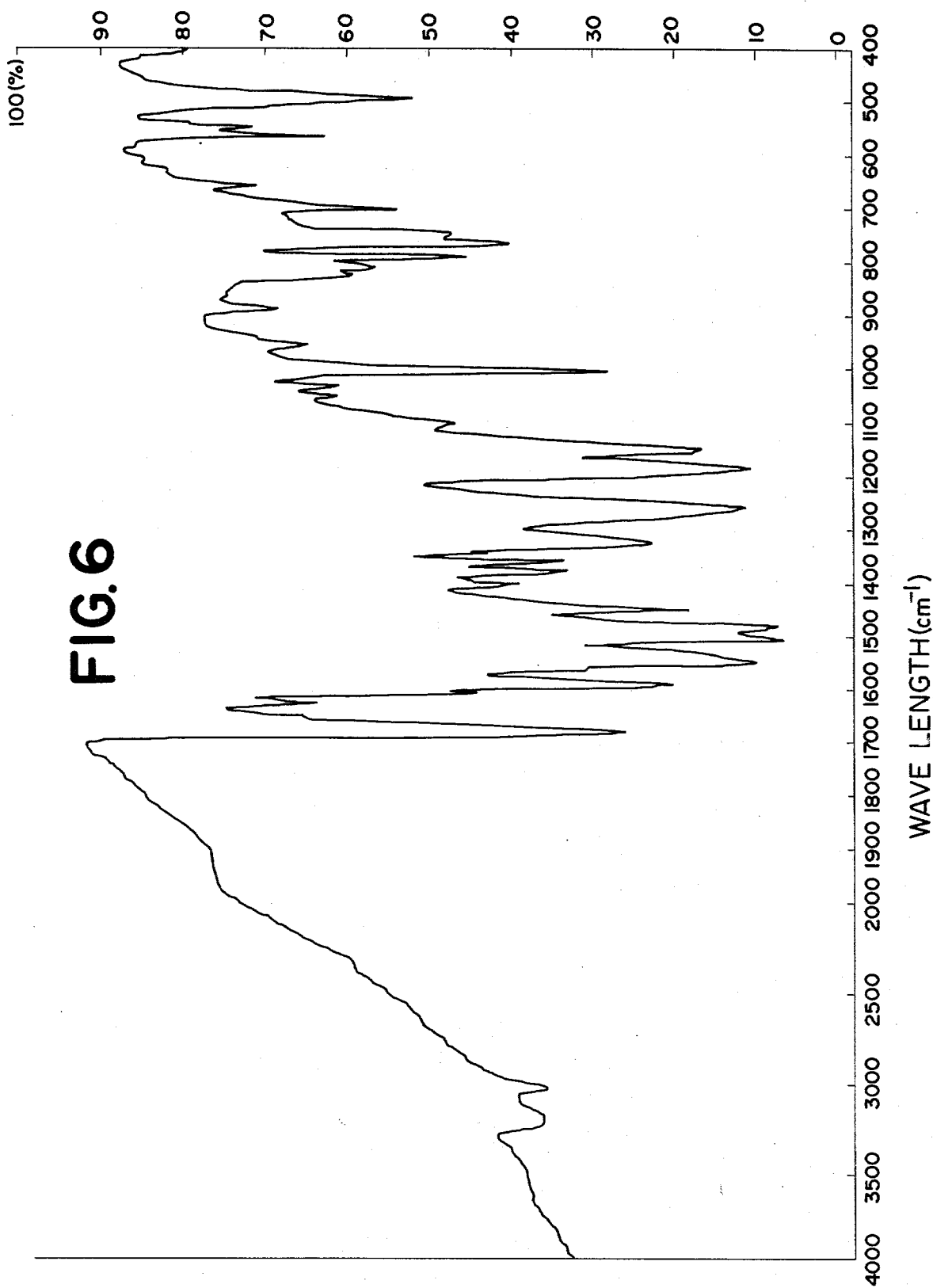
Figure 7:
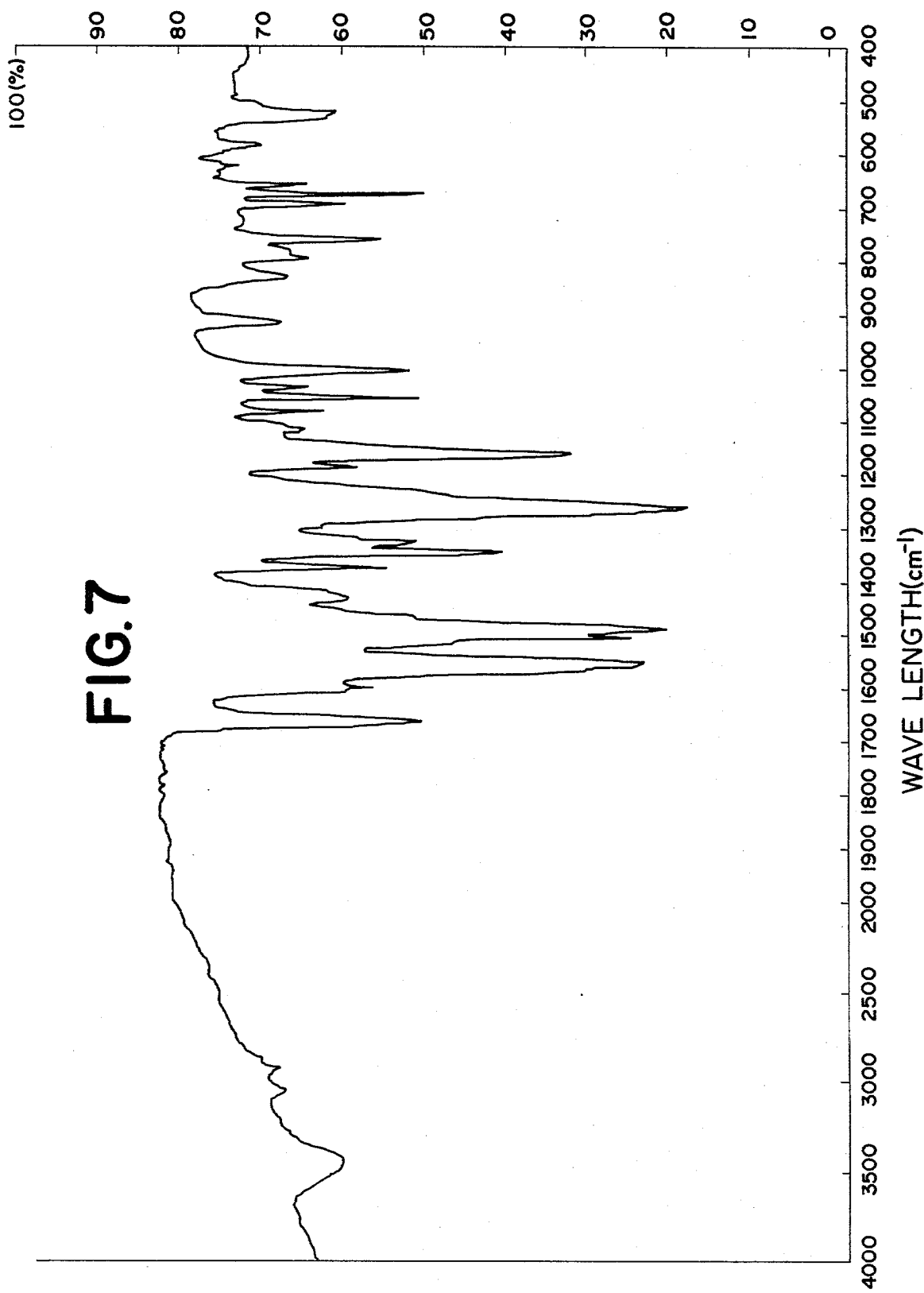

A primary object of the present invention is to provide novel trisazo compounds which are free from the drawbacks possessed by the photoconductive substances employed for the above described photosensitive materials and are especially useful as photoconductive materials, as well as a process for the preparation of said compounds.

A secondary object of the present invention is to provide electrophotographic sensitive materials having a high sensitivity as well as a high flexibility which materials contain a trisazo compound, said trisazo compound being selectable from a great variety and workable as an effective ingredient in various electrophotographic processes.

In other words, one embodiment of the present invention is a trisazo compound expressed by the general formula I

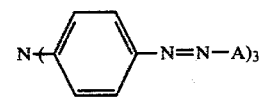

[wherein A represents

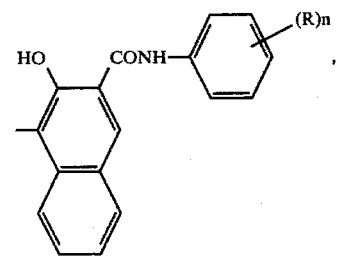

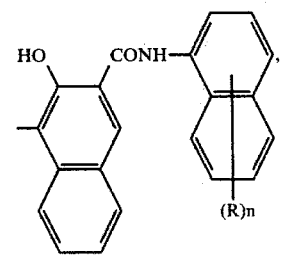

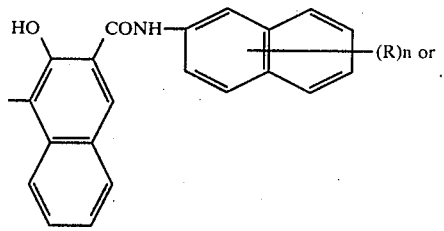

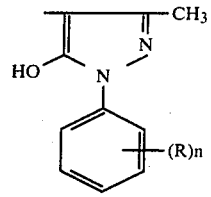

(wherein R represents hydrogen alkyl, radical, alkoxy radical, nitro radical, dialkylamino radical or halogen, n is an integer of 1, 2 or 3, and R may be either identical or different when n is an integer of 2 or 3)].

These trisazo compounds are colored crystals at normal temperature, and concrete examples are as shown in the following Table-1.

TABLE 1

| | Structural formula of trisazo compound (melting point) | Elementary analysis theoretical | experimental | Infrared absorption spectrum | Color tone |
|---|---|---|---|---|---|
| (I) | (250° C. or more) | C 74.45<br>H 4.35<br>N 12.58 | 74.09<br>4.12<br>12.42 | 1680 cm$^{-1}$ (secondary amide) | bluish purple |
| (II) | (250° C. or more) | C 74.86<br>H 4.71<br>N 12.12 | 74.40<br>4.41<br>11.82 | 1680 cm$^{-1}$ (secondary amide) | bluish purple |
| (III) | (250° C. or more) | C 71.87<br>H 4.52<br>N 11.64 | 71.67<br>4.40<br>11.44 | 1680 cm$^{-1}$ (secondary amide) | bluish purple |
| (IV) | (250° C. or more) | C 66.40<br>H 3.63<br>N 14.59 | 66.28<br>3.37<br>13.99 | 1680 cm$^{-1}$ (secondary amide) | bluish purple |
| (V) | (decomposition point: about 243° C.) | C 72.50<br>H 5.11<br>N 14.66 | 72.51<br>5.05<br>14.10 | 1680 cm$^{-1}$ (secondary amide) | bluish purple |
| (VI) | (250° C. or more) | C 68.12<br>H 3.73<br>N 11.51 | 67.68<br>3.78<br>11.02 | 1680 cm$^{-1}$ (secondary amide) | bluish purple |

TABLE 1-continued

| Structural formula of trisazo compound (melting point) | Elementary analysis theoretical | experimental | Infrared absorption spectrum | Color tone |
|---|---|---|---|---|
| (VII) 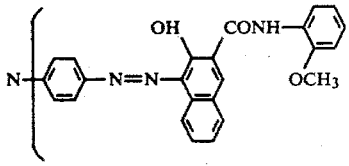 (250° C. or more) | C 71.87 H 4.52 N 11.64 | 71.59 4.36 11.52 | 1680 cm$^{-1}$ (secondary amide) | bluish purple |
| (VIII) 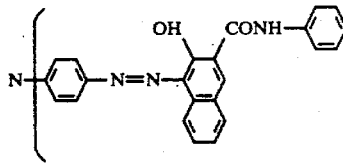 (250° C. or more) | C 66.40 H 3.63 N 14.59 | 66.09 3.66 14.17 | 1680 cm$^{-1}$ (secondary amide) | bluish purple |
| (IX) 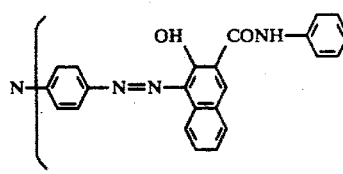 (250° C. or more) | C 74.86 H 4.71 N 12.12 | 73.90 4.53 11.87 | 1680 cm$^{-1}$ (secondary amide) | bluish purple |
| (X) 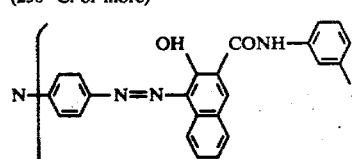 (250° C. or more) | C 68.12 H 3.73 N 11.51 | 67.75 3.79 11.13 | 1680 cm$^{-1}$ (secondary amide) | bluish purple |
| (XI) 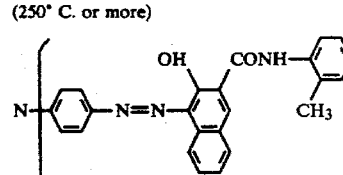 (250° C. or more) | C 75.23 H 5.05 N 11.70 | 75.01 5.19 11.34 | 1680 cm$^{-1}$ (secondary amide) | bluish purple |
| (XII) 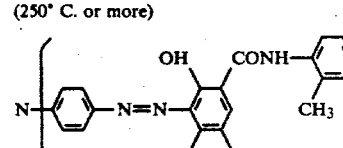 (250° C. or more) | C 68.71 H 4.08 N 11.13 | 68.27 4.01 11.02 | 1680 cm$^{-1}$ (secondary amide) | bluish purple |
| (XIII) 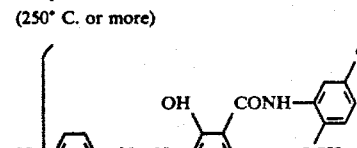 (250° C. or more) | C 69.65 H 4.68 N 10.83 | 69.48 4.56 10.33 | 1680 cm$^{-1}$ (secondary amide) | bluish purple |
| (XIV) 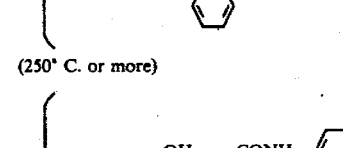 | C 64.50 H 4.11 N 10.03 | 63.98 4.37 9.64 | 1680 cm$^{-1}$ (secondary amide) | bluish purple |

TABLE 1-continued

| | Structural formula of trisazo compound (melting point) | Elementary analysis theoretical | Elementary analysis experimental | Infrared absorption spectrum | Color tone |
|---|---|---|---|---|---|
| (XV) | (250° C. or more) [structure with OH, CONH, Cl, OCH₃, OCH₃ groups] | C 64.50<br>H 4.11<br>N 10.03 | 64.31<br>4.41<br>9.84 | 1680 cm$^{-1}$ (secondary amide) | bluish purple |
| (XVI) | (250° C. or more) [structure with OH, CONH, naphthyl] | C 77.01<br>H 4.31<br>N 11.09 | 76.73<br>4.08<br>10.83 | 1680 cm$^{-1}$ (secondary amide) | bluish purple |
| (XVII) | (250° C. or more) [structure with OH, CONH, naphthyl] | C 77.01<br>H 4.31<br>N 11.09 | 76.39<br>4.21<br>11.25 | 1680 cm$^{-1}$ (secondary amide) | bluish purple |
| (XVIII) | (250° C. or more) [structure with CH₃, HO, phenyl] (decomposition point: about 170° C.) | C 68.15<br>H 4.65<br>N 21.53 | 68.20<br>4.46<br>21.49 | | red |

In this connection, the infrared absorption spectrum (according to KBr Tablet process) of Compounds (I), (IV), (VI), (XII), (XIV) and (XVIII) among these trisazo compounds expressed by the general formula I are as shown in FIGS. 1 through 7, respectively.

Trisazo compounds expressed by the general formula I according to the present invention can be prepared by the process described below. That is to say, another embodiment of the present invention is a process of preparation of the foregoing novel trisazo compounds, which process comprises diazotizing 4,4′,4″-triaminotriphenyl amine expressed by the structural formula

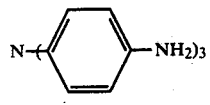

into a hexazonium salt expressed by the structural formula

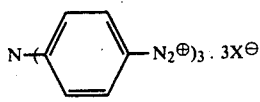

(wherein X represents anionic functional radical) and then reacting this salt with one of the compounds expressed by the following general formulas

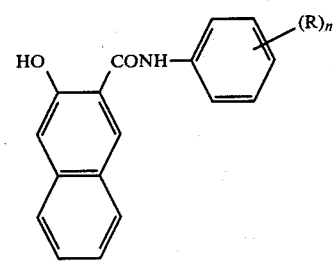 (a)

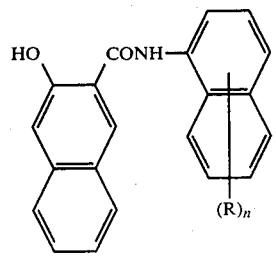 (b)

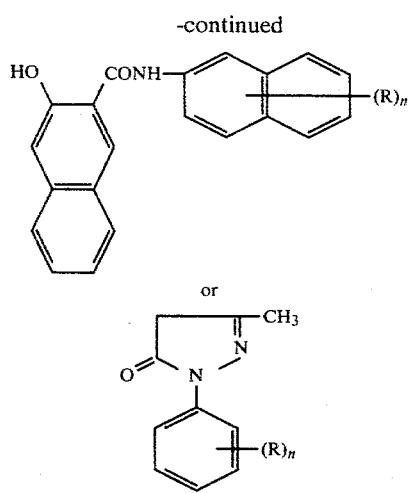

[in (a), (b), (c) and (d), R represents hydrogen, alkyl radical, alkoxy radical, nitro radical, dialkylamino radical or halogen, n is an integer of 1, 2 or 3, and R may be either identical or different when n is an integer of 2 or 3)].

In this process of preparation, said diazotization of 4,4′,4″-triaminotriphenyl amine is effected by adding an aqueous solution of sodium nitrite thereto within a dilute inorganic acid such as dilute hydrochloric acid or dilute sulfuric acid at a temperature of about −10° C. to 10° C. This diazotization reaction completes in 30 minutes to 3 hours. Further, it is desirable to precipitate the hexazonium salt by adding borofluoric acid or the like to the reactant mixture and then filter said salt, thereby obtaining crystals.

Subsequently, by adding the foregoing compound (a), (b), (c) or (d) (also called coupling ingredient) to this hexazonium salt, coupling a reaction is effected between the hexazonium salt and the coupling ingredient. Practically speaking, this reaction is effected by the procedure comprising preparing a solution by mixing the hexazonium salt and the coupling ingredient with an organic solvent such as N,N-dimethyl formamide, dimethyl sulfoxide, etc. and adding to this solution dropwise an aqueous solution of alkali such as sodium acetate at a temperature of about −10° C. to 30° C. This reaction completes in 5 minutes to 3 hours. Novel trisazo compound prepared in this way are useful as photoconductive materials for electrophotographic sensitive materials as stated above.

Accordingly, still another embodiment of the present invention is the application of the thus obtained trisazo compounds as well as analogues thereof to electrophotographic sensitive materials. That is to say, the photosensitive material according to the present invention is an electrophotographic sensitive material which comprises a conductive support and a photosensitive layer formed thereon, said photosensitive layer containing a trisazo compound, as an effective ingredient, which is expressed by the general formula II

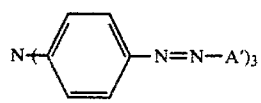

[wherein A′ represents

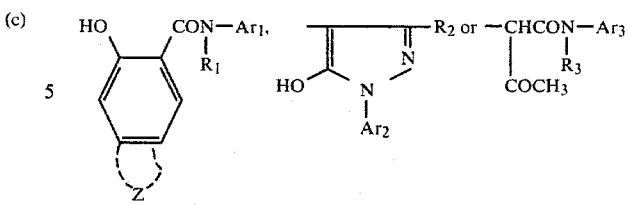

(wherein Z represents aromatic rings such as benzene ring, naphthalene ring, etc., hetero rings such as indole ring, carbazole ring, benzofuran ring, etc. or their substituents, Ar₁ represents aromatic rings such as benzene ring, naphthalene ring, etc., hetero rings such as dibenzofuran, etc. or their substituents, Ar₂ and Ar₃ represent aromatic rings such as benzene ring, naphthalene ring, etc. or their substituents, R₁ and R₃ represent hydrogen, lower alkyl radical, phenyl radical or their substituents, and R₂ represents lower alkyl radical, carboxyl radical or their esters)].

Shown hereunder in terms of their structural formulas are concrete examples of the compounds expressed by the foregoing general formula II which are useful in the electrophotographic sensitive materials according to the present invention.

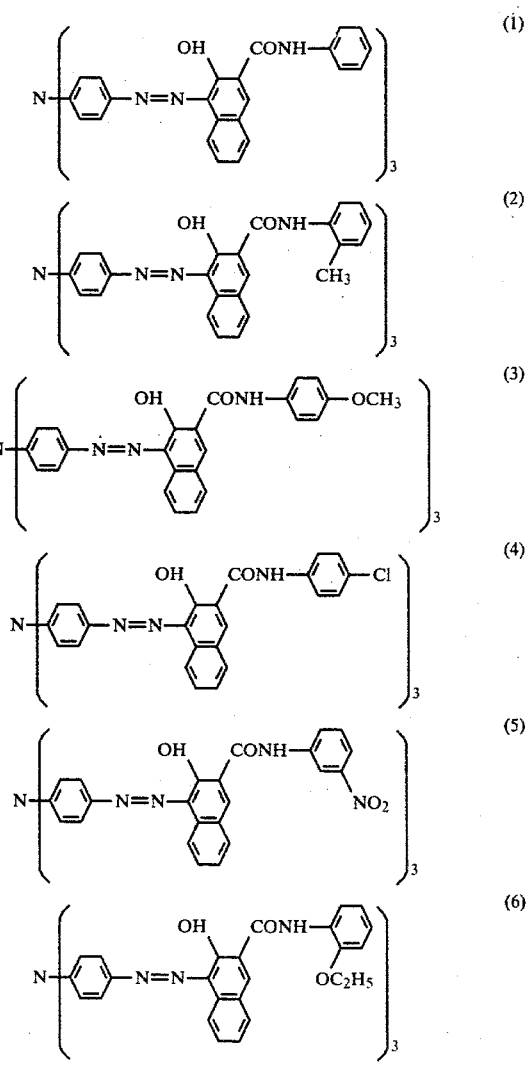

-continued
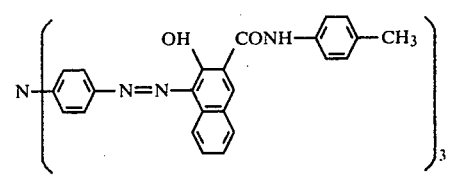 (7)
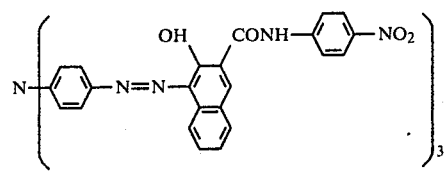 (8)
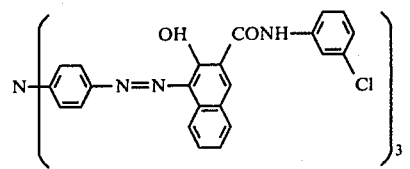 (9)
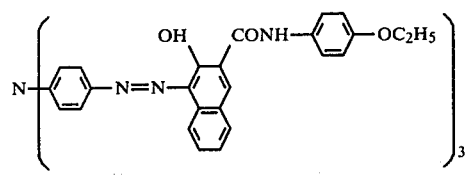 (10)
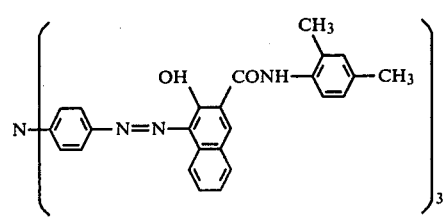 (11)
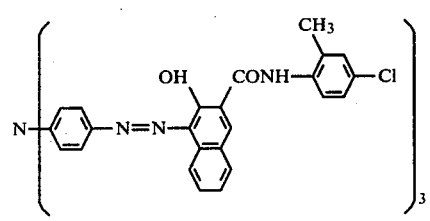 (12)
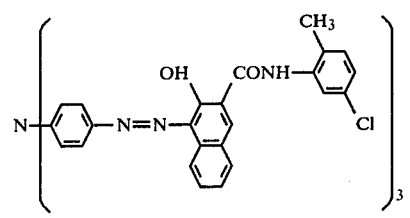 (13)
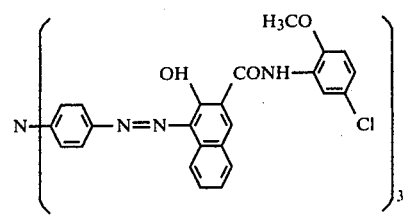 (14)
-continued
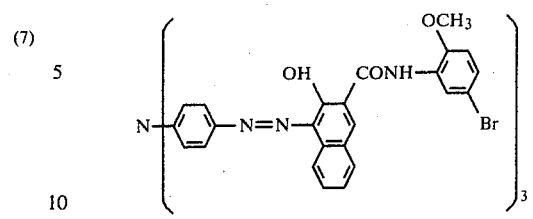 (15)
(16)
(17)
(18)
(19)
(20)
(21)
(22)

-continued
(23) 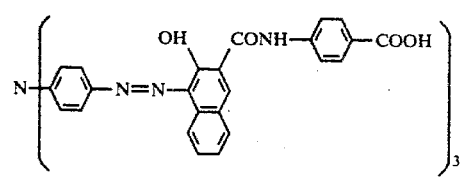
(24) 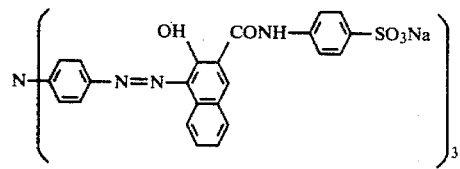
(25) 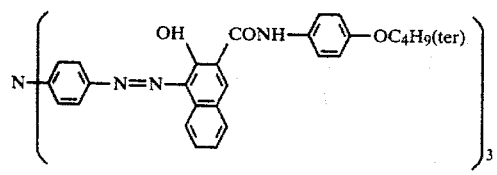
(26) 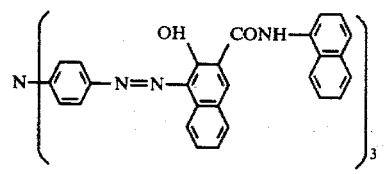
(27) 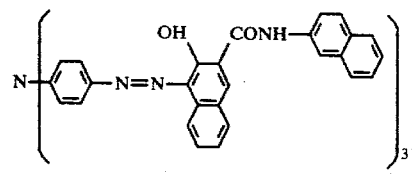
(28) 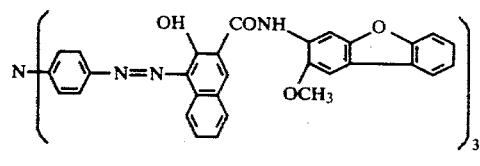
(29) 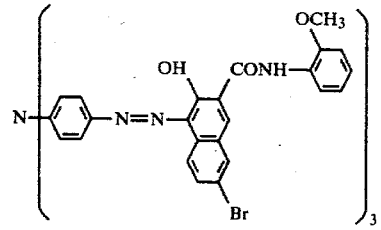
(30) 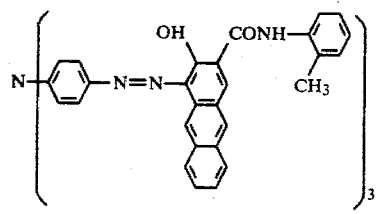
-continued
(31) 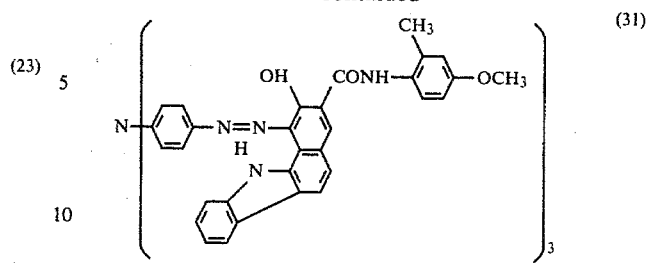
(32) 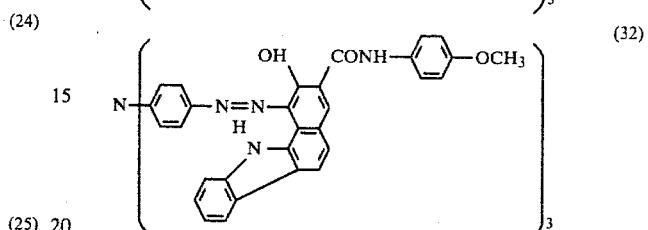
(33) 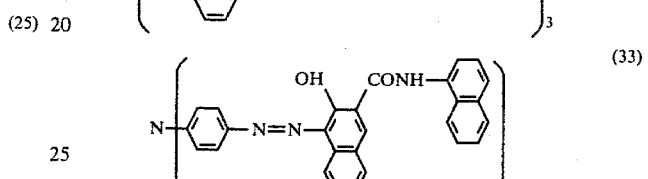
(34) 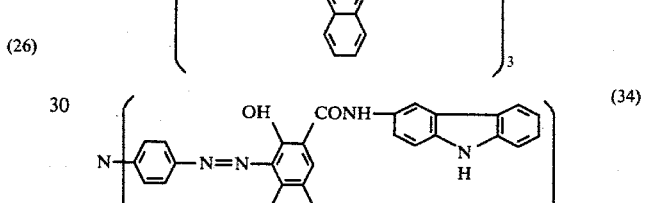
(35) 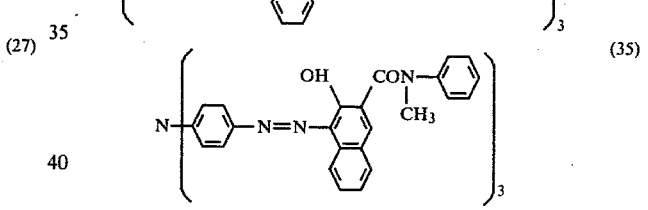
(36) 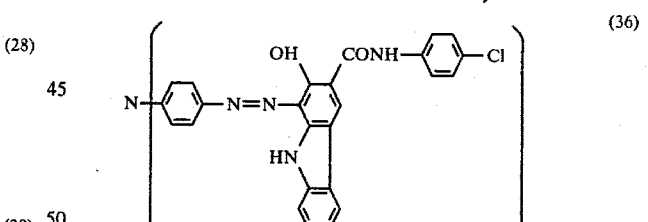
(37) 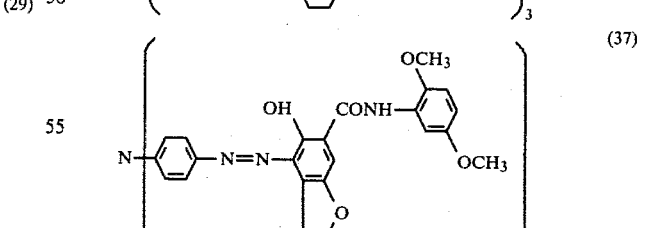
(38) 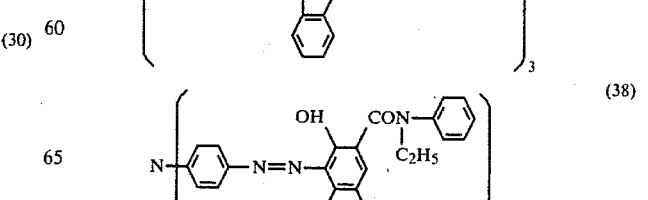

-continued
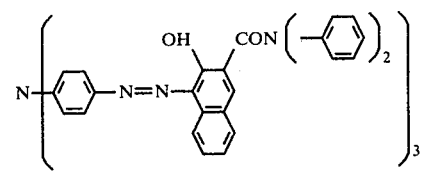 (39)
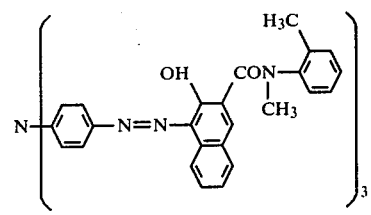 (40)
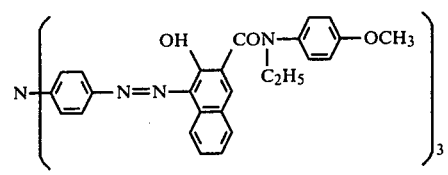 (41)
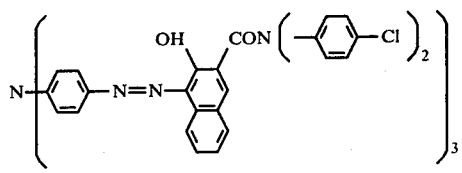 (42)
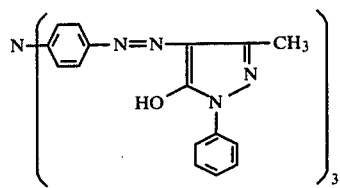 (43)
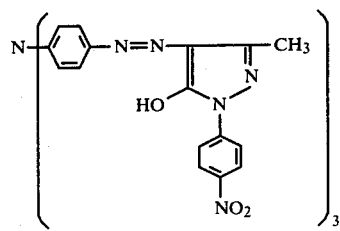 (44)
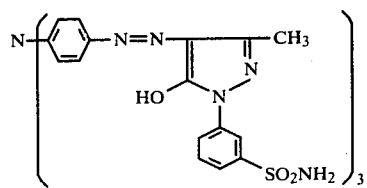 (45)
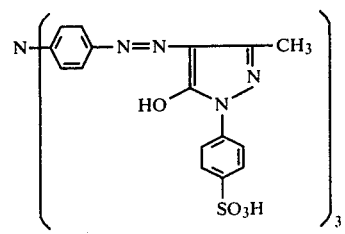 (46)
-continued
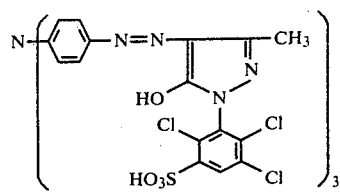 (47)
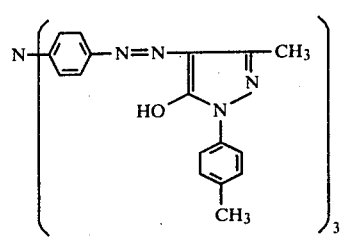 (48)
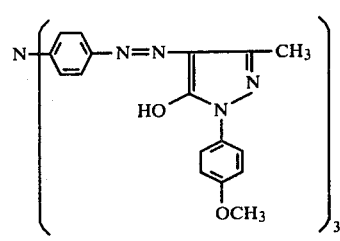 (49)
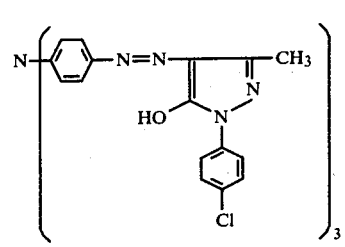 (50)
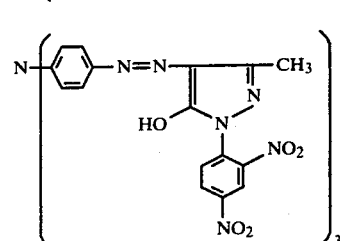 (51)
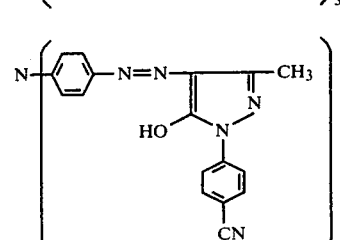 (52)
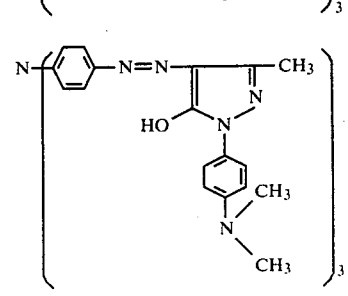 (53)

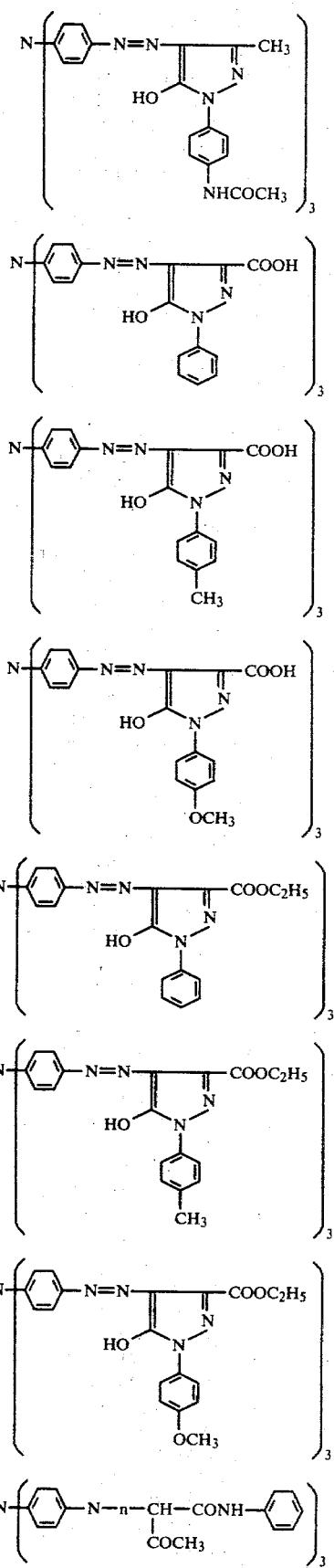

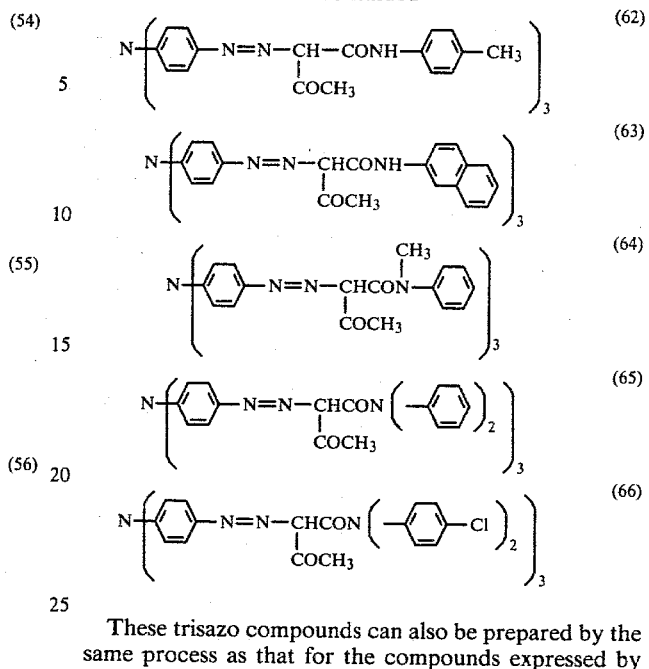

These trisazo compounds can also be prepared by the same process as that for the compounds expressed by the general formula I. That is, these trisazo compounds can be easily prepared by the procedure comprising first diazotizing the starting material 4,4′,4″-triaminotriphenyl amine by the conventional method to precipitate a hexazonium salt and thereafter effecting coupling within an appropriate organic solvent such as N,N-dimethyl formamide in the presence of a compound corresponding to A′ in the foregoing general formula II (a coupler of naphthol AS type, etc.) together with alkali.

Figure 8:
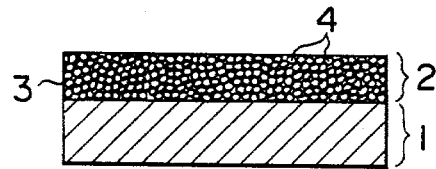
FIGS. 8 through 10 are respectively enlarged cross sectional views of the photosensitive materials according to the present invention.
Figure 9:
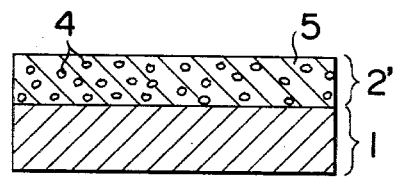
Figure 10:
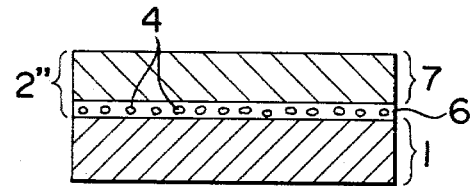

The photosensitive materials according to the present invention contain the aforementioned trisazo compounds and can assume such structures as are illustrated in FIGS. 8 through 10 according to the way of application of these compounds. The photosensitive material illustrated in FIG. 8 is one prepared by forming a trisazo compound 4 (which serves herein as a photoconductive substance)—resinous binder 3 type photosensitive layer 2 on a conductive support 1. The photosensitive material illustrated in FIG. 9 is one prepared by forming a trisazo compound 4 (which serves herein as a charge-carrier generating substance)—charge-transfer medium (which is a mixture of a charge-transfer substance and a resinous binder) 5 type photosensitive layer 2′ on a conductive support 1. And, the photosensitive material illustrated in FIG. 10 is a modification of the photosensitive material in FIG. 9, and the photosensitive layer 2″ thereof consists of a charge-carrier generating layer 6 consisting of a trisazo compound 4 and a charge-transfer medium layer 7.

In the photosensitive material of FIG. 8, the trisazo compound probably acts as a photoconductive substance, and transfer of the charge-carrier necessary for light decay is probably performed through the particles of the compound. In the case of the photosensitive material of FIG. 9, said charge-transfer substance probably forms a charge-transfer medium together with a binder (plus a plasticizer as occasion demands), while the trisazo compound probably acts as a charge-carrier generating substance. The charge-transfer medium does not have any charge-carrier generating ability like the trisazo compound, but it has an ability to accept and transfer the charge-carrier generated by the trisazo compounds. That is, in the case of the photosensitive material of FIG. 9, generation of the charge-carrier necessary for light decay is probably performed by the trisazo compound, while transfer of the charge-carrier is probably performed mainly by the charge-transfer medium. An essential condition further required for the charge-transfer medium on this occasion is that the range of the absorption wavelength of the charge-transfer medium should not fall on mainly the range of the absorption wavelength of the visible region of trisazo compound. The reason for this is that, in order to generate the charge-carrier efficiently in the trisazo compound, it is necessary to transmit the light to the surface of the compound. This rule, however, does not apply to the case of, for instance, a photosensitive material which is only sensitive to a specific wavelength. Therefore, the absorption wavelength of the charge-transfer medium and that of the trisazo compound should not completely overlap each other. Next, in the case of the photosensitive material of FIG. 10, the light after passing through the charge-transfer medium layer probably reaches to the photosensitive layer 2″ constituting a charge-carrier generating layer to cause generation of the charge-carrier in the trisazo compound of this portion, while the charge-transfer medium layer accepts and transfers the charge-carrier pouring therein. The mechanism that generation of the charge-carrier necessary for light decay may be performed by the trisazo compound and transfer of the charge-carrier may be performed by the charge-transfer medium in this photosensitive material is the same as in the case of the photosensitive material illustrated in FIG. 9. The trisazo compound herein is also a charge-carrier generating substance.

In order to prepare the photosensitive material of FIG. 8, it suffices to coat a dispersion obtained by dispersing fine particles of a trisazo compound in a binder solution on a conductive support and dry thereafter. In order to prepare the photosensitive material of FIG. 9, it suffices to disperse fine particles of a trisazo compound in a solution obtained by dissolving a charge-transfer substance in a binder, coat the resulting dispersion on a conductive support, and dry thereafter. And, the photosensitive material of FIG. 10 can be obtained either by depositing a trisazo compound on a conductive support through vacuum evaporation or through the procedure comprising dispersing fine particles of a trisazo compound in an appropriate solvent containing a binder dissolved therein as occasion demands, coating the resulting dispersion on a conductive support and drying thereafter, subjecting the thus formed photosensitive layer to the surface finishing by, for instance, puff-grinding or the like, if necessary, thereby adjusting the thickness of the coating film, and thereafter coating thereon a solution containing a charge-transfer substance and a binder, followed by drying. In any case, the trisazo compound for use in the present invention is employed after being pulverized to a particle diameter of less than 5μ, preferably less than 2μ, by means of a ball-mill or the like. Coating is performed by the conventional means such as doctor blade, wire bar, etc. The thickness of the photosensitive layer in the case of the photosensitive materials illustrated in FIG. 8 and FIG. 9 is about 3 to 50μ, preferably 5 to 20μ. In the case of the photosensitive material illustrated in FIG. 10, the desirable thickness of the charge-carrier generating layer is less than 5μ, preferably less than 2μ, and the thickness of the charge-transfer medium layer is about 3 to 50μ, preferably 5 to 20μ. In the case of the photosensitive material illustrated in FIG. 8, the appropriate ratio of the trisazo compound contained in the photosensitive layer is 30 to 70 wt.%, preferably about 50 wt.% based on the weight of the photosensitive layer. (As described in the foregoing, in the case of the photosensitive material of FIG. 8, the trisazo compound acts as a photoconductive substance, and generation and transfer of the charge-carrier necessary for light decay are performed by the compound particles. Therefore, contact between the compound particles is desirable to be continuous from the photosensitive layer surface to the support. Accordingly, the ratio of the compound to the photosensitive layer is desirable to be relatively high, but when the strength and the sensitivity of the photosensitive layer are taken into consideration, it is preferably about 50%.) In the case of the photosensitive material illustrated in FIG. 9, the trisazo compound accounts for 1 to 50 wt.%, preferably less than 20 wt.%, of the photosensitive layer, and the charge-transfer substance accounts for 10 to 95 wt.%, preferably 30 to 90 wt.%, of the photosensitive layer. In the case of the photosensitive material illustrated in FIG. 10, the ratio of the charge-transfer substance to the charge-transfer medium layer is 10 to 95 wt.%, preferably 30 to 90 wt.%, like the ratio of the charge-transfer substance to the photosensitive layer in the photosensitive material of FIG. 9. Further, in the preparation of all photosensitive materials in FIGS. 8 through 10, it is possible to employ some plasticizer jointly with the binder.

In the photosensitive materials according to the present invention, as the conductive support, a plate or foil of metal such as aluminum, etc., a plastic film deposited with a metal such as aluminum, etc., through vacuum evaporation, or a paper processed for conductivity are useful. As applicable binders, there can be cited such condensation resins as polyamide, polyurethane, polyester, epoxide resin, polyketone, polycarbonate, etc. and such vinyl polymers as polyvinyl ketone, polystyrene, poly-N-vinyl carbazole, polyacrylamide, etc.; yet, resins having insulating and adhesive properties are all useful. As applicable plasticizers, there can be cited halogenated paraffin, polybiphenyl chloride, dimethyl naphthalene, dibutyl phthalate, etc. To cite applicable charge-transferable substances, as for high molecular substance, there are such vinyl polymers as poly-N-vinyl carbazole, halogenated poly-N-vinyl carbazole, polyvinyl pyrene, polyvinyl indroquinoxaline, polyvinyl dibenzothiophene, polyvinyl anthracene, polyvinyl acridine, etc. and such condensation resins as pyreneformaldehyde resin, bromopyrene-formaldehyde resin, ethyl carbazole-formaldehyde resin, chloroethyl carbazole-formaldehyde resin, etc., and as for low molecular substances (monomers), there are fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 8H-indeno[2,1-b]thiophene-8-one, 2-nitro-8H-indeno[2,1-b]thiophene-8-one, 2-bromo-6,8-dinitro-4H-indeno[1,2-b]thiophene, 6,8-dinitro-4H-indeno[1,2-b]thiophene, 2-nitrodibenzothiophene, 2,8-dinitrobenzothiophene, 3-nitrodibenzothiopenen-5-oxide, 3,7-dinitrodibenzothiophene-5-oxide, 1,3,7-trinitrodibenzothiophene-5,5-dioxide, 3-nitrodibenzothiophene-5,5-dioxide, 3,7-dinitrodibenzothiophene-5,5- dioxide, 4-dicyanomethylene-4H-indeno[1,2-b]thiophene, 6,8-dinitro-4-dicyanomethylene-4H-indeno[1,2-b]thiophene, 1,3,7,9-tetranitrobenzo[c]cinnoline-5-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrenequinone, 1,4-naphthoquinonebenzo[a]anthracene-7,12-dione, 2,4,7-trinitro-9-dicyanomethylene fluorene, tetrachlorophthalic anhydride, 1-bromopyrene, 1-methylpyrene, 1-ethylpyrene, 1-acetylpyrene, carbazole, N-ethyl carbazole, N-β-chloroethyl carbazole, N-β-hydroxyethyl carbazole, 2-phenyl indole, 2-phenyl naphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyl oxazole, triphenyl amine, tris(4-diethylaminophenyl)methane, 3,6-bis(dibenzylamino)-9-ethyl carbazole, etc. These charge-transfer substances are employed either singly or upon compounding two or more of them.

Further, all of the photosensitive materials thus prepared can be provided with an adhesive layer or a barrier layer disposed in between the conductive support and the photosensitive layer as occasion demands. As the materials for use in forming these layers, polyamide, nitrocellulose, aluminum oxide, etc. are appropriate, and the thickness of the layers is preferably less than 1μ.

In order to perform the copying by using a photosensitive material according to the present invention, the photosensitive layer side of the photosensitive material is electrified and exposed to light and developing is conducted thereafter, and if necessary, transfer onto a paper and the like is performed, whereby the copying is completed.

The photosensitive materials according to the present invention have excellent advantages such that they are generally high in sensitivity and rich in flexibility.

DESCRIPTION OF THE PREFERRED EMBODIMENTS

Example 1

Preparation of trisazo compound No. 1 (cf. Table-1) according to general formula I 8.7 g of 4,4',4''-triaminotriphenyl amine were added to dilute hydrochloric acid consisting of 150 ml of concentrated hydrochloric acid and 130 ml of water and stirred thoroughly at room temperature for about 30 minutes. Next, after cooling the thus prepared mixture down to about 0° C., a solution prepared by dissolving 7.7 g of sodium nitrite in 30 ml of water was added dropwise thereto in about 20 minutes at a temperature in the range of from −3° to 2° C. Thereafter, the mixture was stirred for about 1 hour at the same temperature as above, and then a small quantity of unreacted matter was filtered. To the resulting filtrate were added 60 ml of an aqueous solution of 42% borofluoric acid, and the crystals separated thereby were collected by filtering, washed in water and dried, whereby there were obtained 15.3 g (yield rate: 87%) of hexazonium trifluoroborate as yellow crystals (decomposition point: about 129° C.). Next, 4.0 g of the thus obtained hexazonium salt together with 11.8 g of 2-hydroxy-3-naphthoic acid anilide as a coupling ingredient were dissolved in 1,700 ml of cooled N,N-dimethyl formamide, and to the resulting solution were added dropwise a solution consisting of 20 g of sodium acetate and 300 ml of water in about 30 minutes at a temperature of 5° to 15° C. Subsequently, the mixture solution was subjected to 4 hours' stirring at the room temperature. Then, the precipitate was collected by filtering, washed 2 times with 1 l of water, and thereafter rinsed 3 times with 1 l of dioxane. After conducting recrystallization 2 times with about 100 ml of nitrobenzene, by drying at 100° C. under a reduced pressure of 2 mmHg, there were obtained 4.7 g (yield rate: 62%) of a trisazo compound corresponding to Compound No. I.

Examples 2 through 18

Preparation of trisazo compounds No. II (Example 2), No. III (Example 3), No. VI (Example 4), No. V (Example 5), No. VI (Example 6), No. VII (Example 7), No. VIII (Example 8), No. IX (Example 9), No. X (Example 10), No. XI (Example 11), No. XII (Example 12), No. XIII (Example 13), No. XIV (Example 14), No. XV (Example 15), No. XVI (Example 16), No. XVII (Example 17), and No. XVIII (Example 18) (cf. Table-1)

Through the same procedure as in Example 1 save for the employment of the respective compounds listed in Table-2 below as coupling ingredient, varieties of trisazo compounds were prepared.

TABLE 2

| Compound No. | Coupling ingredient | Compound No. | Coupling ingredient |
|---|---|---|---|
| II | OH, CONH—(phenyl)—CH₃ (naphthalene) | XI | OH, CONH—(phenyl)(CH₃)—CH₃ (naphthalene) |
| III | OH, CONH—(phenyl)—OCH₃ (naphthalene) | XII | OH, CONH—(phenyl)(CH₃)—Cl (naphthalene) |

TABLE 2-continued

| Compound No. | Coupling ingredient | Compound No. | Coupling ingredient |
|---|---|---|---|
| IV | 3-hydroxy-2-naphthamide with 4-NO$_2$-phenyl | XIII | 3-hydroxy-2-naphthamide with 2,5-di-OCH$_3$-phenyl |
| V | 3-hydroxy-2-naphthamide with 4-N(CH$_3$)$_2$-phenyl | XIV | 3-hydroxy-2-naphthamide with 2,5-di-OCH$_3$-4-Cl-phenyl |
| VI | 3-hydroxy-2-naphthamide with 4-Cl-phenyl | XV | 3-hydroxy-2-naphthamide with 2-Cl-4-OCH$_3$-5-OCH$_3$-phenyl |
| VII | 3-hydroxy-2-naphthamide with 2-OCH$_3$-phenyl | XVI | 3-hydroxy-2-naphthamide with 1-naphthyl |
| VIII | 3-hydroxy-2-naphthamide with 4-NO$_2$-phenyl | XVII | 3-hydroxy-2-naphthamide with 2-naphthyl |
| IX | 3-hydroxy-2-naphthamide with 4-CH$_3$-phenyl | XVIII | 3-methyl-1-phenyl-5-pyrazolone |
| X | 3-hydroxy-2-naphthamide with 3-Cl-phenyl | | |

Example 19

Preparation of electrophotographic sensitive materials 1 part by weight of polyester resin (namely, Polyester Adhesive 49000, the manufacture of Du Pont Inc.), 1 part by weight of trisazo compound No. 1 expressed by the general formula II and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7μ-thick photosensitive layer and a structure as illustrated in FIG. 8.

Subsequently, after charging positive electricity on the photosensitive layer side of this photosensitive material by applying +6 KV corona discharge for 20 seconds by means of a commercial electrostatic copying paper testing apparatus, the photosensitive material was left alone in the dark for 20 seconds, and the surface potential Vpo (volt) at that time was measured. Next, light was applied to the photosensitive layer by means of a tungsten lamp so as to attain the illumination of 20 luxes on the surface thereof, and the time (unit: second) required for reducing said surface potential Vpo to half was sought, whereby the amount of exposure $E_{\frac{1}{2}}$ (lux.-sec) was obtained. The result was as follows:

Vpo = 480 V, $E_{\frac{1}{2}}$ = 7.8 lux.sec.

Examples 20 through 28

Preparation of electrophotographic sensitive materials

Varieties of photosensitive materials were prepared by applying the same procedure as in Example 19 save for employing the respective trisazo compounds referred to by number in the following Table-3 in lieu of the trisazo compound No. 1 used in Example 19. When these photosensitive materials were subjected to the same measurement as in Example 19, the result was as shown in Table-3, respectively.

TABLE 3

| Example No. | Trisazo compound No. | Vpo (volt) | E ½ (lux · sec.) |
|---|---|---|---|
| 20 | 11 | 680 | 36.0 |
| 21 | 18 | 480 | 5.4 |
| 22 | 26 | 450 | 18.0 |
| 23 | 29 | 590 | 33.4 |
| 24 | 33 | 475 | 23.8 |
| 25 | 35 | 850 | 43.7 |
| 26 | 42 | 760 | 37.6 |
| 27 | 48 | 930 | 76.0 |
| 28 | 60 | 790 | 68.5 |

Example 29

Preparation of electrophotographic sensitive material 10 parts by weight of polyester resin (the same as in Example 19), 10 parts by weight of 2,4,7-trinitro-9-fluorenone, 2 parts by weight of trisazo compound No. 2 expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 10μ-thick photosensitive layer and a structure illustrated in FIG. 9. Subsequently, measurement of Vpo and E½ of this photosensitive material was conducted through the same procedure as in Example 19 save for applying −6 KV corona discharge instead of +6 KV corona discharge employed in Example 19. The result was as follows:

Vpo = 520 V, E½ = 63 lux.sec.

Examples 30 through 38.

Preparation of electrophotographic sensitive materials

Varieties of photosensitive materials having a structure illustrated in FIG. 9 were prepared by applying the same procedure as in Example 29 save for employing the respective trisazo compounds referred to by number in the following Table-4 instead of the trisazo compound No. 2 used in Example 29. When these photosensitive materials were subjected to the same measurement of Vpo and E½ as in Example 29, the result was as shown in Table-4.

TABLE 4

| Example No. | Trisazo compound No. | Vpo (volt) | E ½ (lux · sec.) |
|---|---|---|---|
| 30 | 8 | 570 | 42.0 |
| 31 | 15 | 540 | 33.7 |
| 32 | 19 | 760 | 58.6 |
| 33 | 27 | 550 | 31.4 |
| 34 | 31 | 650 | 27.4 |
| 35 | 36 | 640 | 28.6 |
| 36 | 38 | 520 | 37.6 |
| 37 | 44 | 670 | 76.3 |
| 38 | 58 | 640 | 74.5 |

Example 39

Preparation of electrophotographic photosensitive material 10 parts by weight of polyester resin (the same as in Example 19), 10 parts by weight of 2,5-bis(4-diethylaminophenyl)-1,3,4-oxadiazole, 2 parts by weight of the trisazo compound No. 3 expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 120° C. for 10 minutes, whereby there was prepared a photosensitive material having a 10μ-thick photosensitive layer and a structure illustrated in FIG. 9. When this photosensitive material was subsequently subjected to the same measurement as in Example 19, the result was as follows:

Vpo = 620 V, E½ = 12.3 lux.sec.

Examples 40 through 48.

Preparation of electrophotographic sensitive materials

Varieties of photosensitive materials having a structure illustrated in FIG. 9 were prepared by applying the same procedure as in Example 39 save for employing the respective trisazo compounds referred to by number in the following Table-5 instead of the trisazo compound No. 3 used in Example 39. When these photosensitive materials were subsequently subjected to the same measurement of Vpo and E½ as in Example 19, the result was as shown in Table-5, respectively.

TABLE 5

| Example No. | Trisazo compound No. | Vpo (volt) | E ½ (lux · sec.) |
|---|---|---|---|
| 40 | 9 | 575 | 15.4 |
| 41 | 20 | 650 | 17.5 |
| 42 | 28 | 540 | 20.0 |
| 43 | 34 | 560 | 18.8 |
| 44 | 39 | 640 | 27.3 |
| 45 | 43 | 710 | 66.2 |
| 46 | 52 | 720 | 69.2 |
| 47 | 57 | 670 | 72.6 |
| 48 | 64 | 750 | 79.1 |

Example 49

Preparation of electrophotographic sensitive material 200 parts by weight of poly-N-vinyl carbazole, 33 parts by weight of 2,4,7-trinitro-9-fluorenone, 20 parts by weight of polyester resin (the same as in Example 19) and 20 parts by weight of the trisazo compound No. 4 expressed by the general formula II as added to 1780 parts by weight of tetrahydrofuran were pulverized and mixed together within a ball-mill and the resulting dispersion was coated, by means of a doctor blade, on a polyester film deposited with aluminum through vacuum evaporation and was dried at a temperature of 100° C. for 10 minutes and then at a temperature of 120° C. for 5 minutes, whereby there was prepared a photosensitive material having a 13μ-thick photosensitive layer and a structure illustrated in FIG. 9. When this photosensitive material was subjected to the same measurement as in Example 19, the result was as follows:

$V_{po} = 940$ V, $E_{\frac{1}{2}} = 7.7$ lux.sec.

Examples 50 through 58

Preparation of electrophotographic sensitive materials

Varieties of photosensitive materials having a structure illustrated in FIG. 9 were prepared by applying the same procedure as in Example 49 save for employing the respective trisazo compounds referred to by number in the following Table-6 instead of the trisazo compound No. 4 used in Example 49. When these photosensitive materials were subsequently subjected to the same measurement of Vpo and $E_{\frac{1}{2}}$ as in Example 19, the result was as shown in Table-6, respectively.

TABLE 6

| Example No. | Trisazo compound No. | Vpo (volt) | $E_{\frac{1}{2}}$ (lux · sec.) |
|---|---|---|---|
| 50 | 7 | 920 | 6.0 |
| 51 | 12 | 940 | 7.7 |
| 52 | 21 | 860 | 13.5 |
| 53 | 30 | 900 | 5.1 |
| 54 | 37 | 1000 | 4.8 |
| 55 | 41 | 970 | 8.9 |
| 56 | 46 | 900 | 15.6 |
| 57 | 51 | 930 | 14.1 |
| 58 | 63 | 940 | 16.5 |

Example 59

Preparation of electrophotographic sensitive material 2 parts by weight of the trisazo compound No. 5 expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,4,7-trinitro-9-fluorenone, 2 parts by weight of polycarbonate (namely, Panlite, the manufacture of TEIJIN Co., Ltd.) and 46 parts by weight of tetrahydrofuran together, and this dispersion was coated on the foregoing charge-carrier generating layer by means of a doctor blade and then dried at a temperature of 100° C. for 10 minutes to form a 10μ-thick charge-transfer medium layer, whereby there was obtained a photosensitive material having a structure illustrated in FIG. 10. When the thus obtained photosensitive material was subjected to the same measurement as in Example 19, the result was as follows:

$V_{po} = 920$ V, $E_{\frac{1}{2}} = 13.4$ lux.sec.

Examples 60 through 68

Preparation of electrophotographic sensitive materials

Varieties of photosensitive materials having a structure illustrated in FIG. 10 were prepared by applying the same procedure as in Example 59 save for employing the respective trisazo compounds referred to by number in the following Table-7 instead of the trisazo compound No. 5 used in Example 59. When these photosensitive materials were subsequently subjected to the same measurement of Vpo and $E_{\frac{1}{2}}$ as in Example 19, the result was as shown in Table-7, respectively.

TABLE 7

| Example No. | Trisazo compound No. | Vpo (volt) | $E_{\frac{1}{2}}$ (lux · sec.) |
|---|---|---|---|
| 60 | 10 | 910 | 16.3 |
| 61 | 14 | 900 | 18.4 |
| 62 | 16 | 890 | 10.2 |
| 63 | 23 | 900 | 13.4 |
| 64 | 32 | 920 | 11.4 |
| 65 | 40 | 930 | 9.1 |
| 66 | 45 | 920 | 37.8 |
| 67 | 49 | 870 | 35.7 |
| 68 | 56 | 880 | 31.4 |

Example 69

Preparation of electrophotographic sensitive material 2 parts by weight of the trisazo compound No. 6 expressed by the general formula II and 98 parts by weight of tetrahydrofuran were pulverized and mixed together within a ball-mill, and the resulting dispersion was coated, by means of a doctor blade, of a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,5-bis(4-diethylaminophenyl)-1,3,4-oxadiazole, 2 parts by weight of polycarbonate (the same as in Example 59) and 46 parts by weight of tetrahydrofuran together, and this dispersion was coated on the foregoing charge-carrier generating layer by means of a doctor blade and then dried at a temperature of 120° C. for 10 minutes to form a 10 μ-thick charge-transfer medium layer, whereby there was obtained a laminate type photosensitive material illustrated in FIG. 10. When the thus obtained photosensitive material was subjected to the same measurement as in Example 19 save for applying −6 KV corona discharge, the result was as follows:

$V_{po} = 960$ V, $E_{\frac{1}{2}} = 8.9$ lux.sec.

Examples 70 through 78

Varieties of photosensitive materials were prepared by applying the same procedure as in Example 69 save for employing the respective trisazo compounds referred to by number in the following Table-8 instead of the trisazo compound No. 6 used in Example 69. When these photosensitive materials were subsequently subjected to the same measurement of Vpo and $E_{\frac{1}{2}}$ as in Example 19, the result was as shown in Table-8, respectively.

TABLE 8

| Example No. | Trisazo compound No. | Vpo (volt) | E ½ (lux · sec.) |
|---|---|---|---|
| 70 | 13 | 1020 | 6.7 |
| 71 | 17 | 980 | 8.3 |
| 72 | 22 | 950 | 5.8 |
| 73 | 25 | 990 | 9.5 |
| 74 | 27 | 1000 | 10.2 |
| 75 | 50 | 1040 | 30.2 |
| 76 | 55 | 990 | 34.5 |
| 77 | 59 | 1010 | 29.7 |
| 78 | 66 | 1000 | 63.0 | phenyl)-1,3,4-oxadiazole used in the same with 9-(p-diethylamino)anthracene in an equivalent thereto.

When the thus obtained photosensitive materials were subjected to the same measurement as in Example 19, the result was as shown in Table-9, respectively. In this context, the result of the same measurement conducted on the dispersion-type photosensitive material obtained in Example 49 is also listed in Table-9. The showing in this table verifies that the photosensitive materials according to the present invention are superior to those known heretofore in surface potential as well as sensitivity.

TABLE 9

| Compound | | Dispersion-type photosensitive material | | Laminate-type photosensitive material | |
|---|---|---|---|---|---|
| | | Vpo | E ½ | Vpo | E ½ |
| Comparative Example 1 (U.S. Pat. 3,898,084) | [structure] | 920 | 27.7 | — | — |
| Comparative Example 2 (U.S. Pat. 3,898,084) | [structure] | — | — | 800 | 4.3 |
| Comparative Examples 3 and 4 (U.S. Pat. 4,052,210) | [structure] | 435 | 17.1 | 820 | 5.8 |
| Examples 49 and 79 | [structure] No. 4 | 940 | 7.7 | 860 | 2.2 |

Example 79 and Comparative Examples 1 through 4

Comparison with well-known electrophotographic sensitive materials 2 varieties of dispersion-type photosensitive materials having a structure illustrated in FIG. 9 were prepared by applying the same procedure as in Example 49 save for replacing the trisazo compound No. 4 used in Example 49 with the respective disazo compounds described in U.S. Pat. No. 3,898,084 and U.S. Pat. No. 4,052,210 (cf. Comparative Examples 1 and 3 in the following Table-9) in an equivalent thereto.

Further, 3 varieties of laminate-type photosensitive materials having a structure illustrated in FIG. 10 were prepared by applying the same procedure as in Example 69 save for replacing the trisazo compound No. 6 used in Example 69 with the trisazo compound No. 4 (cf. Example 79 in Table-9) and disazo compounds described in the foregoing two U.S. Pat. No. (cf. Comparative Examples 2 and 4 in Table-9) in an equivalent thereto, and also replacing 2,5-bis(4-diethylamino-

What is claimed is:

1. An electrophotographic material which comprises an electrically conductive support and a photosensitive layer formed thereon, said photosensitive layer consisting essentially of fine particles of a trisazo compound having the formula

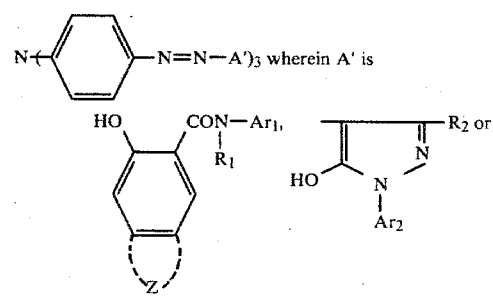

-continued $$-\underset{\underset{COCH_3}{|}}{\overset{\overset{R_3}{|}}{C}}HCON-Ar_3 \text{ and wherein}$$ 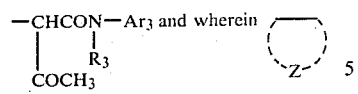

is a fused ring selected from the group consisting of benzene ring, bromobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, dimethylphenyl, methylchlorophenyl, methoxychlorophenyl, methoxybromophenyl, methylmethoxyphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, nitrophenyl, benzenesulfonamide, benzenesulfonic acid, trichlorobenzenesulfonic acid, methylphenyl, methoxyphenyl, chlorophenyl, dinitrophenyl, cyanophenyl, dimethylaminophenyl and acetylaminophenyl; each of $R_1$ and $R_3$ is a member selected from the group consisting of hydrogen, methyl, ethyl, phenyl and chlorophenyl; and $R_2$ is selected from the group consisting of methyl, carboxyl and $COOC_2H_5$; and a resinous binder.

2. An electrophotographic material according to claim 1, wherein the particle size of said trisazo compound is less than 5 microns, the content of said trisazo compound is in the range of from 30 to 70% based on the weight of said photosensitive layer and the thickness of said photosensitive layer is about 3 to 50 microns.

3. An electrophotographic material according to claim 1 in which A' is

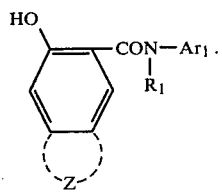

4. An electrophotographic material according to claim 1 in which A' is

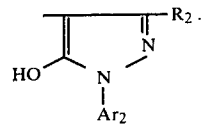

5. An electrophotographic material according to claim 1 in which A' is

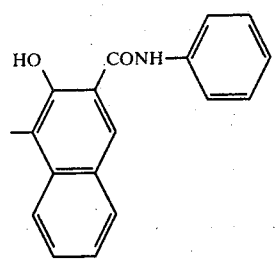

6. An electrophotographic material according to claim 1 in which A' is

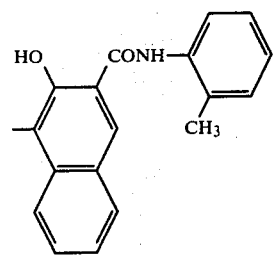

7. An electrophotographic material according to claim 1 in which A' is

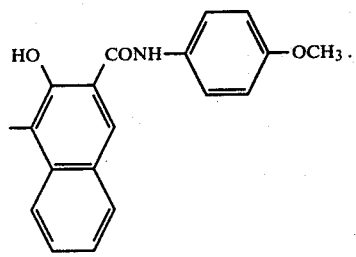

8. An electrophotographic material according to claim 1 in which A' is

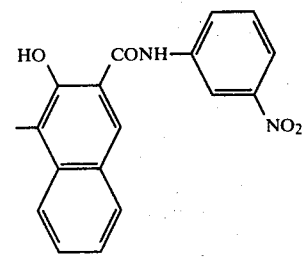

9. An electrophotographic material according to claim 1 in which A' is

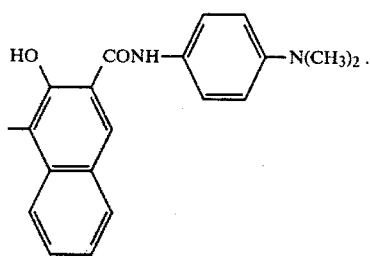

10. An electrophotographic material according to claim 1 in which A' is

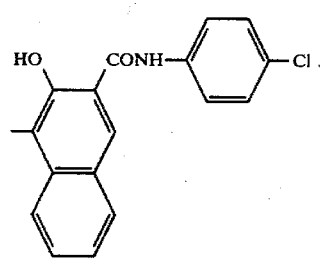

11. An electrophotographic material according to claim 1 in which A' is

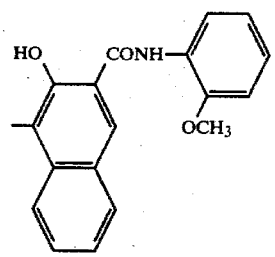

12. An electrophotographic material according to claim 1 in which A' is

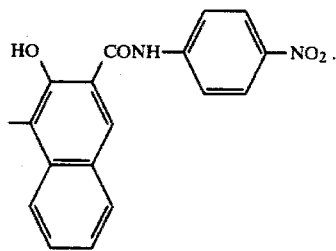

13. An electrophotographic material according to claim 1 in which A' is

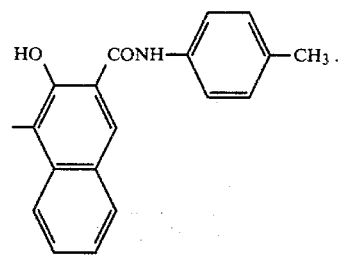

14. An electrophotographic material according to claim 1 in which A' is

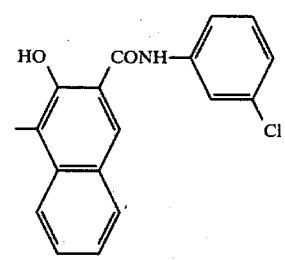

15. An electrophotographic material according to claim 1 in which A' is

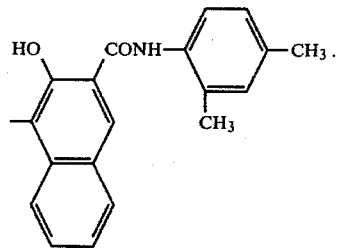

16. An electrophotographic material according to claim 1 in which A' is

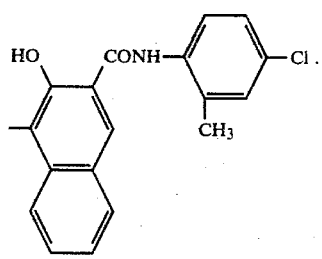

17. An electrophotographic material according to claim 1 in which A' is

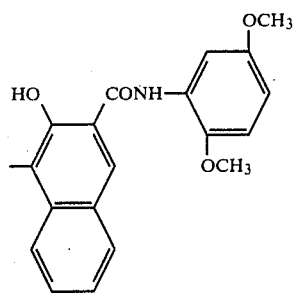

18. An electrophotographic material according to claim 1 in which A' is

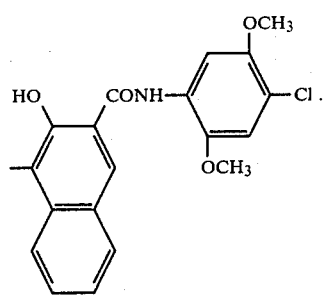

19. An electrophotographic material according to claim 1 in which A' is

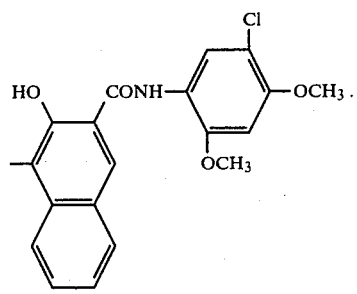

20. An electrophotographic material according to claim 1 in which A' is

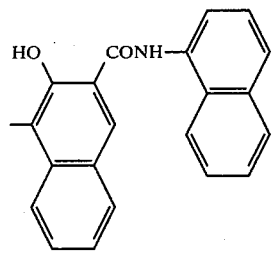

21. An electrophotographic material according to claim 1 in which A' is

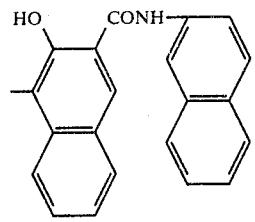

22. An electrophotographic material according to claim 1 in which A' is

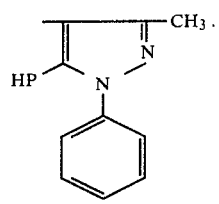

23. An electrophotographic material which comprises an electrically conductive support and a photosensitive layer formed thereon, said photosensitive layer consisting essentially of fine particles of a trisazo compound having the formula

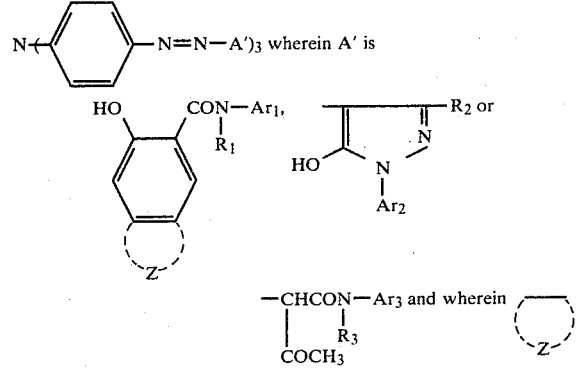

is a fused ring selected from the group consisting of benzene ring, bromobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, dimethylphenyl, methylchlorophenyl, methoxychlorophenyl, methoxybromophenyl, methylmethoxyphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, nitrophenyl, bezenesulfonamide, benzenesulfonic acid, trichlorobenzenesulfonic acid, methylphenyl, methoxyphenyl, chlorophenyl, dinitrophenyl, cyanophenyl, dimethylaminophenyl and acetylaminophenyl; each of $R_1$ and $R_3$ is a member selected from the group consisting of hydrogen, methyl, ethyl, phenyl and chlorophenyl; and $R_2$ is selected from the group consisting of methyl, carboxyl and $COOC_2H_5$; a charge-transfer substance and a resinous binder.

24. An electrophotographic material to claim 23, wherein the particle size of said trisazo compound is less than 5 microns, the content of said trisazo compound and said charge-transfer substance are in the range of from 1 to 50% and from 10 to 95%, respectively, based on the weight of said photosensitive layer, and the thickness of said photosensitive layer is about 3 to 50 microns.

25. An electrophotographic material according to claim 23 in which A' is

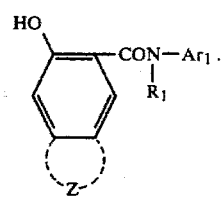

26. An electrophotographic material according to claim 23 in which A' is

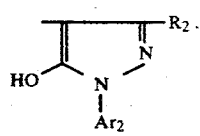

27. An electrophotographic material according to claim 23 in which A' is

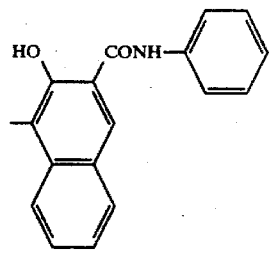

28. An electrophotographic material according to claim 23 in which A' is

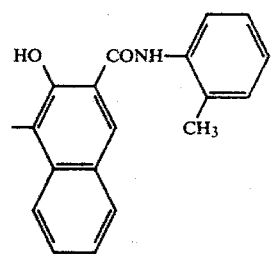

29. An electrophotographic material according to claim 23 in which A' is

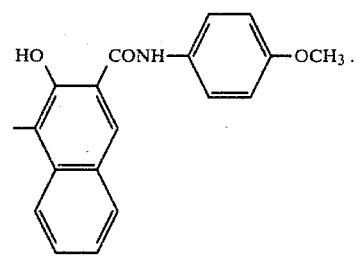

30. An electrophotographic material according to claim 23 in which A' is

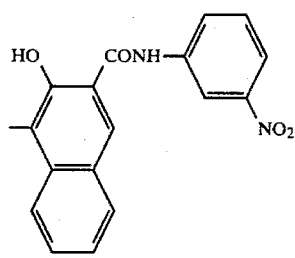

31. An electrophotographic material according to claim 23 in which A' is

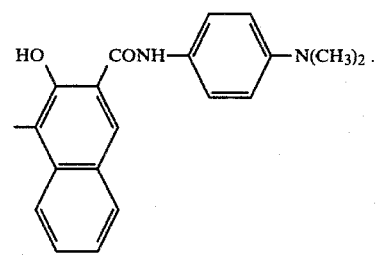

32. An electrophotographic material according to claim 23 in which A' is

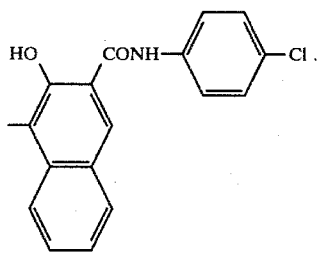

33. An electrophotographic material according to claim 23 in which A' is

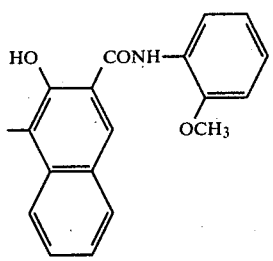

34. An electrophotographic material according to claim 23 in which A' is

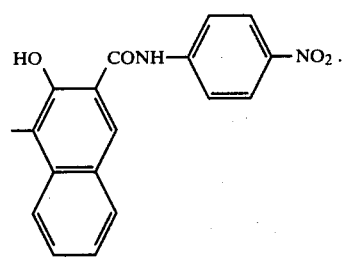

35. An electrophotographic material according to claim 23 in which A' is

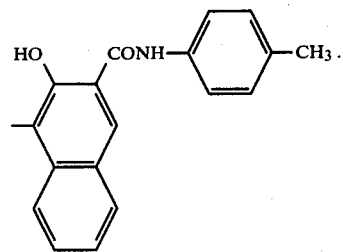

36. An electrophotographic material according to claim 23 in which A' is

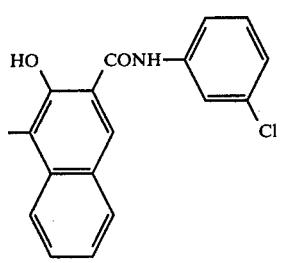

37. An electrophotographic material according to claim 23 in which A' is

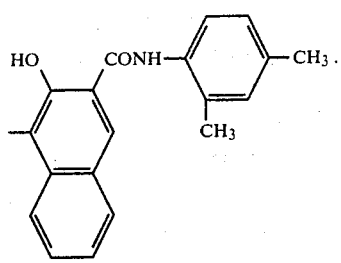

38. An electrophotographic material according to claim 23 in which A' is

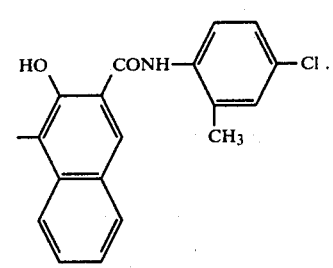

39. An electrophotographic material according to claim 23 in which A' is

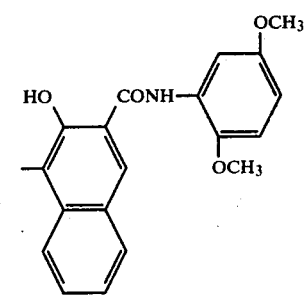

40. An electrophotographic material according to claim 23 in which A' is

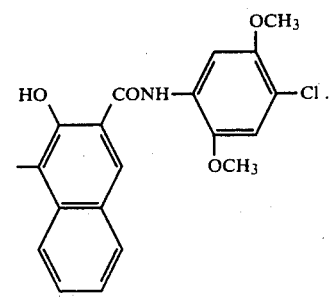

41. An electrophotographic material according to claim 23 in which A' is

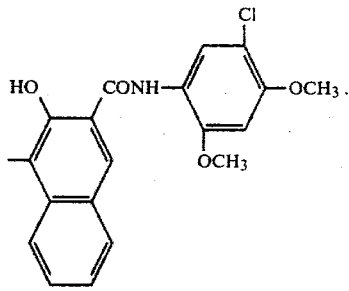

42. An electrophotographic material according to claim 23 in which A' is

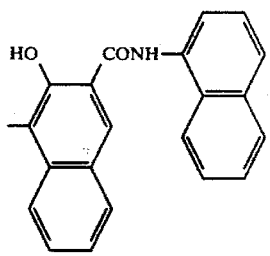

43. An electrophotographic material according to claim 23 in which A' is

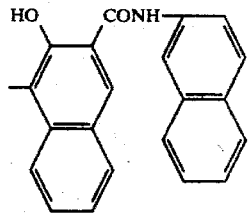

44. An electrophotographic material according to claim 23 in which A' is

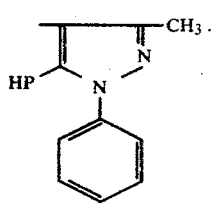

45. An electrophotographic material which comprises a charge-carrier generating layer and a charge-transfer layer as formed on an electrically conductive support, said charge-carrier generating layer consisting essentially of fine particles of a trisazo compound having the formula

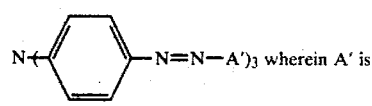

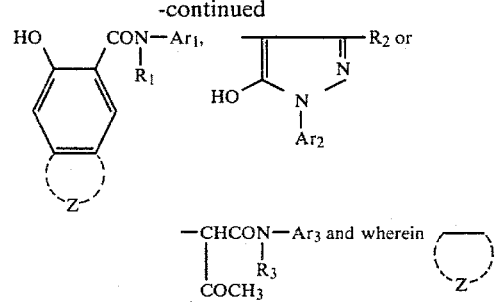

is a fused ring selected from the group consisting of benzene ring, bromobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, dimethylphenyl, methylchlorophenyl, methoxychlorophenyl, methoxybromophenyl, methylmethoxyphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, nitrophenyl, benzenesulfonamide, benzenesulfonic acid, trichlorobenzenesulfonic acid, methylphenyl, methoxyphenyl, chlorophenyl, dinitrophenyl, cyanophenyl, dimethylaminophenyl and acetylaminophenyl; each of $R_1$ and $R_3$ is a member selected from the group consisting of hydrogen, methyl, ethyl, phenyl and chlorophenyl; and $R_2$ is selected from the group consisting of methyl, carboxyl and $COOC_2H_5$; and said charge-transfer layer consisting essentially of a charge-transfer substance and a resinous binder.

46. An electrophotographic material according to claim 45, wherein the particle size of said trisazo compound is less than 5 microns, the thickness of said charge-carrier generating layer is less than 5 microns, the content of said charge-transfer substance is in the range of from 10 to 95% based on the weight of the charge-transfer layer, and the thickness of said charge-transfer layer is about 3 to 50 microns.

47. An electrophotographic material according to claim 45 in which A' is

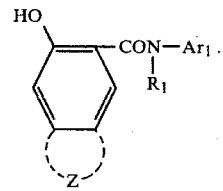

48. An electrophotographic material according to claim 45 in which A' is

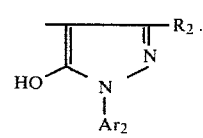

49. An electrophotographic material according to claim 45 in which A' is

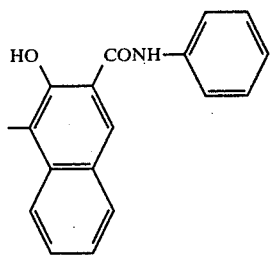

50. An electrophotographic material according to claim 45 in which A' is

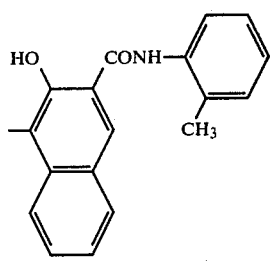

51. An electrophotographic material according to claim 45 in which A' is

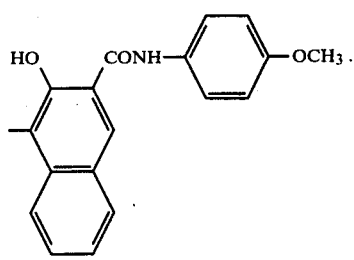

52. An electrophotographic material according to claim 45 in which A' is

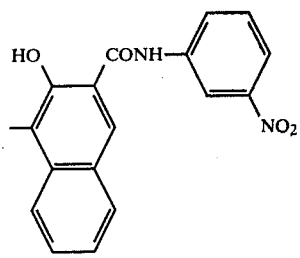

53. An electrophotographic material according to claim 45 in which A' is

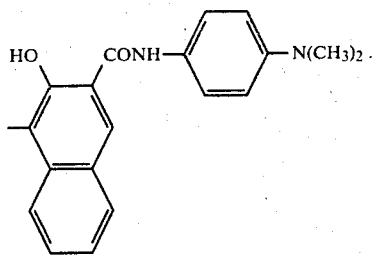

54. An electrophotographic material according to claim 45 in which A' is

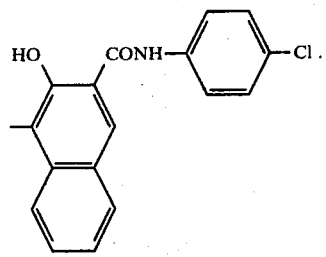

55. An electrophotograhic material according to claim 45 in which A' is

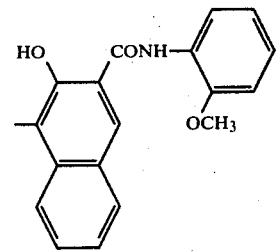

56. An electrophotographic material according to claim 45 in which A' is

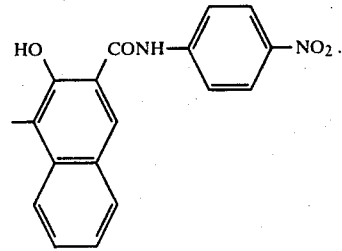

57. An electrophotographic material according to claim 45 in which A' is

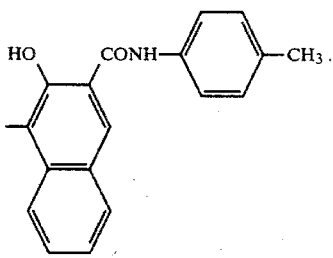

58. An electrophotographic material according to claim 45 in which A' is

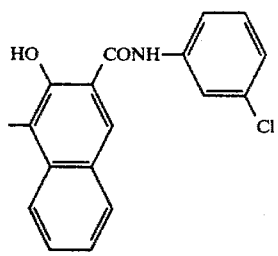

59. An electrophotographic material according to claim 45 in which A' is

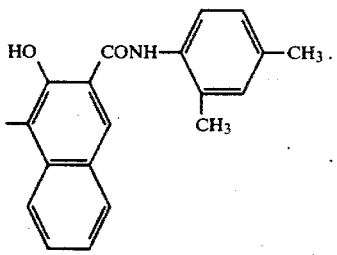

60. An electrophotographic material according to claim 45 in which A' is

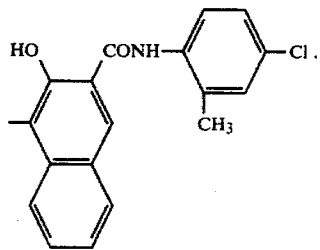

61. An electrophotographic material according to claim 45 in which A' is

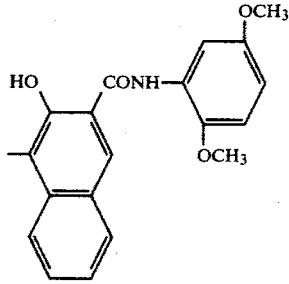

62. An electrophotographic material according to claim 45 in which A' is

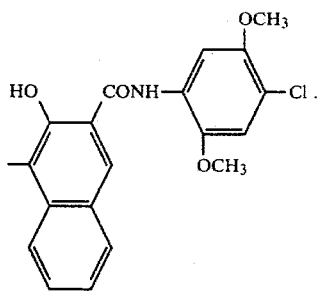

63. An electrophotographic material according to claim 45 in which A' is

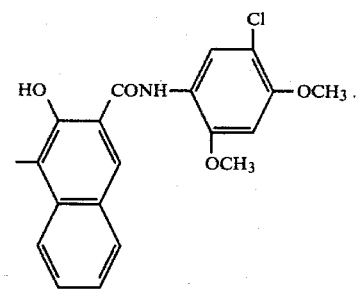

64. An electrophotographic material according to claim 45 in which A' is

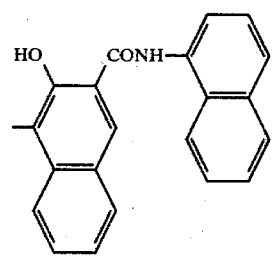

65. An electrophotographic material according to claim 45 in which A' is

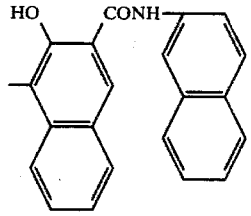

66. An electrophotographic material according to claim 45 in which A' is

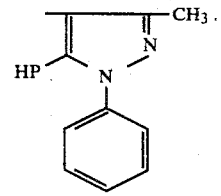

* * * * *

UNITED STATES PATENT OFFICE
CERTIFICATE OF CORRECTION

Patent No. 4,279,981          Dated July 21, 1981

Inventor(s) Masafumi Ohta, Kiyoshi Sakai, Mitsuru Hashimoto, Akio Kozima and Masaomi Sasaki It is certified that error appears in the above-identified patent and that said Letters Patent are hereby corrected as shown below:

Col. 36, line 17; the formula should read as follows:

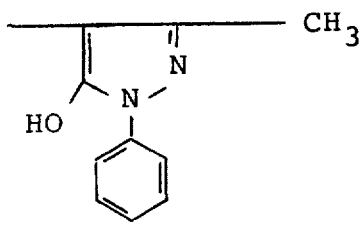

Col. 37, line 1; after "material" insert ---according---.

Col. 37, line 19; the formula should read as follows:

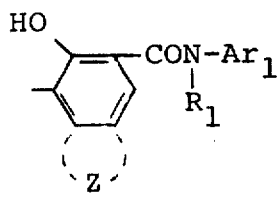

UNITED STATES PATENT OFFICE
CERTIFICATE OF CORRECTION

Patent No. 4,279,981     Dated July 21, 1981

Inventor(s) Masafumi Ohta, Kiyoshi Sakai, Mitsuru Hashimoto, Akio Kozima and Masaomi Sasaki It is certified that error appears in the above-identified patent and that said Letters Patent are hereby corrected as shown below:

Col. 41, line 50; the formula should read as follows:

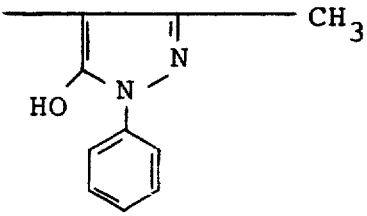

Col. 42, line 52; the formula should read as follows:

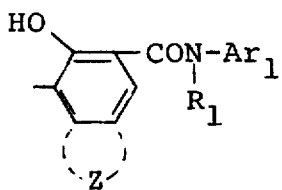

UNITED STATES PATENT OFFICE
CERTIFICATE OF CORRECTION

Patent No. 4,279,981          Dated July 21, 1981

Inventor(s) Masafumi Ohta, Kiyoshi Sakai, Mitsuru Hashimoto, Akio Kozima and Masaomi Sasaki It is certified that error appears in the above-identified patent and that said Letters Patent are hereby corrected as shown below:

Col. 46, line 62; the formula should read as follows:

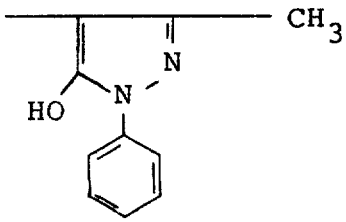

Signed and Sealed this

Eighth Day of December 1981

[SEAL]

Attest:

Attesting Officer

GERALD J. MOSSINGHOFF
Commissioner of Patents and Trademarks